(12) United States Patent
McGhee

(10) Patent No.: US 12,186,681 B2
(45) Date of Patent: Jan. 7, 2025

(54) RESIDUAL SOLVENT RECOVERY APPARATUSES AND METHODS

(71) Applicant: TamiE, Inc., Monument, CO (US)

(72) Inventor: David McGhee, Monument, CO (US)

(73) Assignee: Gene Pool Technologies, Inc., Cherry Hills Village, CO (US)

( * ) Notice: Subject to any disclaimer, the term of this patent is extended or adjusted under 35 U.S.C. 154(b) by 0 days.

(21) Appl. No.: 18/518,258

(22) Filed: Nov. 22, 2023

(65) Prior Publication Data

US 2024/0091670 A1    Mar. 21, 2024

Related U.S. Application Data

(63) Continuation of application No. 17/210,771, filed on Mar. 24, 2021, now Pat. No. 11,865,474.

(51) Int. Cl.
*B01D 11/02* (2006.01)

(52) U.S. Cl.
CPC ...... *B01D 11/0296* (2013.01); *B01D 11/0207* (2013.01); *B01D 11/0219* (2013.01); *B01D 11/028* (2013.01); *B01D 11/0288* (2013.01)

(58) Field of Classification Search
None
See application file for complete search history.

(56) References Cited

U.S. PATENT DOCUMENTS

| | | | | |
|---|---|---|---|---|
| 5,879,081 | A * | 3/1999 | Chordia | B01F 33/71 366/347 |
| 2015/0276729 | A1 * | 10/2015 | Li | B01J 20/286 436/527 |

\* cited by examiner

*Primary Examiner* — Tam M Nguyen
(74) *Attorney, Agent, or Firm* — Daniel C. Pierron; Widerman Malek, PL

(57) ABSTRACT

An extraction vessel including an elongated vessel defining at least an interior cavity for solid-liquid extraction and a plurality of protrusions that are arranged within the elongated vessel, extend into the interior cavity, and are arranged to thermally regulate a core of a solvent-bearing mass within the interior cavity.

15 Claims, 30 Drawing Sheets

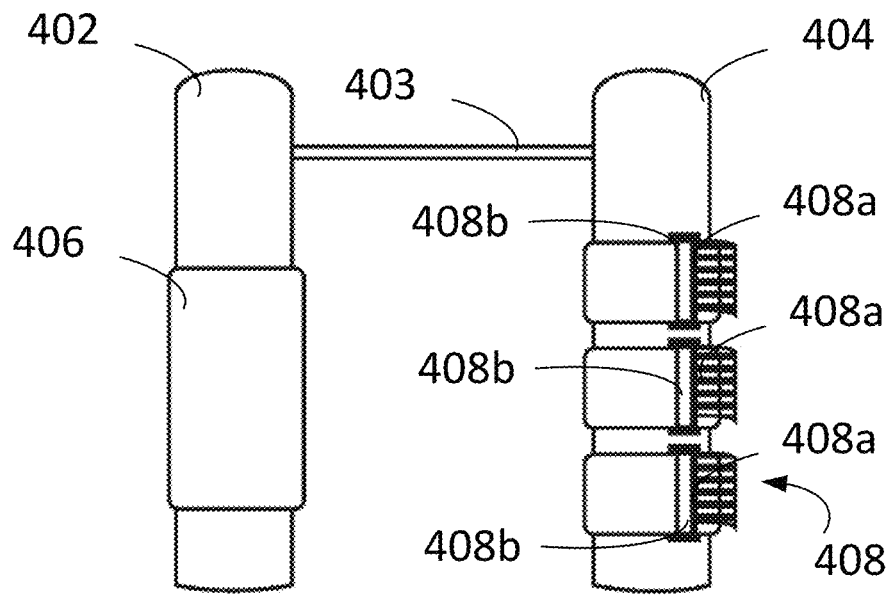
FIG. 4  Prior Art
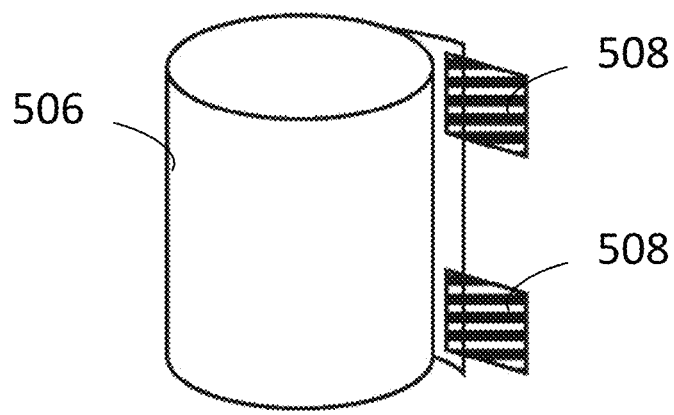
FIG. 5-1  Prior Art
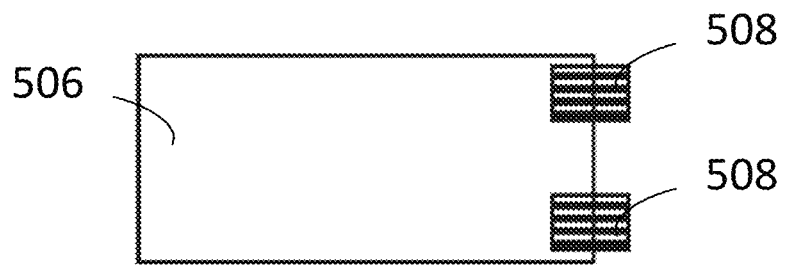
Prior Art  FIG. 5-2

Introducing, into an extraction vessel with solvent-bearing mass, a first heated fluid portion into a first input orifice of the extraction vessel, the first heated fluid portion having a first temperature that is at least equal to a first solvent boiling point temperature
1202

Evaporating, by the first heated fluid portion, a first liquid solvent portion from the solvent-bearing mass, thereby producing a first solvent vapor portion
1204a

Heating, during the evaporating step 1204a, the extraction vessel or a coupled component thereof for maintaining the first heated fluid portion at at least the first temperature
1205

Collect at least the first solvent vapor portion after exiting a first output orifice of the extraction vessel
1206

At least substantially containing, during the collecting the at least the first solvent vapor portion step, the first heated fluid portion within the extraction vessel.
1208

FIG. 12

Condensing, during the collecting the at least the first solvent vapor portion step 1206, at least a sub-portion of the first heated fluid portion within the extraction vessel.
1208a

FIG. 13

Evaporating, by a second heated fluid portion, a second liquid solvent portion from the solvent-bearing mass, thereby producing a second solvent vapor portion
1210

FIG. 14

Introducing, into an extraction vessel, a first heated fluid portion into a first input orifice of the extraction vessel, the first heated fluid portion having a first temperature that is at least equal to a solvent boiling point temperature that is sufficient to evaporate at least a sub-plurality of solvents
1202a

Evaporating, by the first heated fluid portion, a first liquid solvent portion comprising at least the sub-plurality of solvents, thereby producing a first solvent vapor portion
1204b

FIG. 15

```
┌─────────────────────────────────────────────────────────────┐
│ Maintaining, for at least the extraction vessel, at least a │
│                 solvent boiling-point temperature           │
│                           1207a                             │
└─────────────────────────────────────────────────────────────┘
                               │
                               ▼
┌─────────────────────────────────────────────────────────────┐
│ After at least step 1204a, monitoring at least an extraction│
│                      vessel pressure                        │
│                           1209a                             │
└─────────────────────────────────────────────────────────────┘
                               │
                               ▼
┌─────────────────────────────────────────────────────────────┐
│ If the monitored pressure indicates that residual solvent   │
│ remains in the extraction vessel, removing further residual │
│              solvent from the extraction vessel             │
│                           1212                              │
└─────────────────────────────────────────────────────────────┘
```

FIG. 16-1

```
┌─────────────────────────────────────────────────────────────┐
│ Maintaining at least a solvent-boiling point temperature for│
│ the extraction vessel and at least a solvent-condensing     │
│ temperature for a fluidly connected extraction system       │
│                        component                            │
│                           1207b                             │
└─────────────────────────────────────────────────────────────┘
                               │
                               ▼
┌─────────────────────────────────────────────────────────────┐
│ After at least step 1204a, monitoring a pressure of at least│
│ an extraction vessel and the fluidly connected extraction   │
│                    system component                         │
│                           1209b                             │
└─────────────────────────────────────────────────────────────┘
                               │
                               ▼
┌─────────────────────────────────────────────────────────────┐
│ If the monitored pressure indicates that residual solvent   │
│ remains within the extraction vessel, removing further      │
│         residual solvent from the extraction vessel         │
│                           1212                              │
└─────────────────────────────────────────────────────────────┘
```

FIG. 16-2

RESIDUAL SOLVENT RECOVERY APPARATUSES AND METHODS

RELATED APPLICATIONS

This application, which in turn is a continuation application of and claims priority under 35 U.S.C. § 120 of U.S. patent application Ser. No. 17/210,771 filed on Mar. 24, 2021, now U.S. Pat. No. 11,865,474, and titled RESIDUAL SOLVENT RECOVERY APPARATUSES AND METHODS. The content of this application is incorporated herein by reference.

FIELD OF THE INVENTION

The present invention relates to recycling solvent, including efficiently, in terms of recovery percentage, energy expenditure, and/or time, recovering solvent from a solvent-bearing mass that has undergone one or more extraction cycles.

BACKGROUND

The processes and apparatuses utilized for solute extraction, such as the oil extracted from animal or plant-derived material and/or other masses (e.g., synthetics, pharmaceutically active substances derived from fermentation and/or biosynthesis), typically apply solvent to said material(s).

Biomass extraction may include the extraction of terpenoids, flavors, fragrances and/or (possibly other) pharmaceutically active ingredients from materials of natural origin. Examples of biomass materials include but are not limited to flavorsome or aromatic substances such as hops, coriander, cloves, star anise, coffee, citrus peels, fennel seeds, cumin, ginger and other kinds of bark, leaves, flowers, fruit, roots, rhizomes and seeds. Biomass may also be extracted in the form of biologically active substances such as pesticides and pharmaceutically active substances or precursors thereto, obtainable e.g., from plant material, a cell culture or a fermentation broth.

Biomass also may include, but are not limited to terpenoids (e.g., cannabinoids and terpenes), flavonoids, and/or other components from (1) *cannabis*, hemp, and/or derivatives thereof (e.g., hash, sift, kief, and rosin, among other examples) and (2) other botanical substances such as terpenoid-bearing plants and/or fruits and/or extracting psilocin, baeocystin, and/or norbaeocystin from psilocibe mushrooms and/or derivatives thereof.

Example solvents include carbon dioxide, hydrocarbon (s), ethanol and mixture thereof. For example, a hydrocarbon solvent may include at least one of Isobutane, N-Butane, and/or propane solvent. Other possible solvents may include the family of solvents based on organic hydrofluorocarbons that contain carbon, hydrogen, and fluorine.

There are known techniques for removing solvent residues from a solvent-bearing mass (e.g., biomass) after, for example, a solid-liquid extraction. Ethanol operators utilize centrifugal separators to spin the solvent-bearing mass at high speeds for recovering residual ethanol.

Another technique is evacuating and heating (e.g., with a heating jacket) extraction vessel 11, which may remove some residual solvent in the solvent-bearing mass. This method may have significant drawbacks. For example, poor heat penetration at the core of the solvent-bearing mass can occur, thereby resulting in uneven heating, leaving the core "solvent soaked", but the sections near the vessel wall thermally degraded or otherwise befouled.

FIG. 2 shows a "steam-based", prior-art method for removing residual solvent, as described in U.S. Pat. No. 6,685,839. Solvent is introduced to the packed bed 12 of biomass within extraction vessel 11 via inlet 13. The solvent passes upwards through the biomass, contacts it, and entrains with biomass extract. The solvent-extract mixture is conveyed via outlet 14 and delivery line 15 to, for example, the remainder of the extraction circuit of FIG. 1.

Steam is supplied via line 19 and flow control valve 17 to which both the solvent line 18 and steam line 19 are connected. Steam line 19 includes an optional drain valve 27 for draining fluid from line 19. Recycle line 26 may recycle steam multiple times through vessel 11.

A flow control valve 20 operably connects outlet 14 to steam line 23 for delivering solvent-entrained steam to a separator that is in the form of a hollow container 24. Said container 24 includes an adsorbent material such as activated carbon for absorbing or otherwise separating solvent from the steam. The container 24 includes an outlet 25, remote from line 23, for steam to reach a condenser (not shown) and, in liquid form, to an effluent drain or reservoir.

A disadvantage to this technique is that it requires a further separation step for removing solvent vapor from the mixture of solvent and steam or water.

As such, the above systems may be improved upon and examples of new and useful systems and methods that are relevant to the needs in the field are discussed below.

BRIEF DESCRIPTION OF THE DRAWINGS

FIG. 4 is a schematic view of a known extraction system;

FIGS. 5-1 and 5-2 are schematic views of a known electric jacket;

FIGS. 8-1, 8-2, 8-3, and 8-4 are cross-sectional views of an extraction vessel;

FIGS. 8-5 and 8-6 are cross-sectional views of an extraction vessel cartridge;

FIGS. 8-7, 8-8, and 8-9 are cross-sectional views of an extraction vessel;

FIGS. 9-1 and 9-2 are cross-sectional views of an extraction vessel or an extraction vessel cartridge;

FIGS. 9-3 and 9-4 are cross-sectional views of an extraction vessel;

FIGS. 11-1, 11-2, 11-3, and 11-4 are cross-sectional diagrams showing different stages of residual solvent removal;

FIGS. 12, 13, 14, 15, 16-1, and 16-2 show various methods and sub-methods for removing residual solvent from a solvent-bearing mass.

SUMMARY

Figure 1:
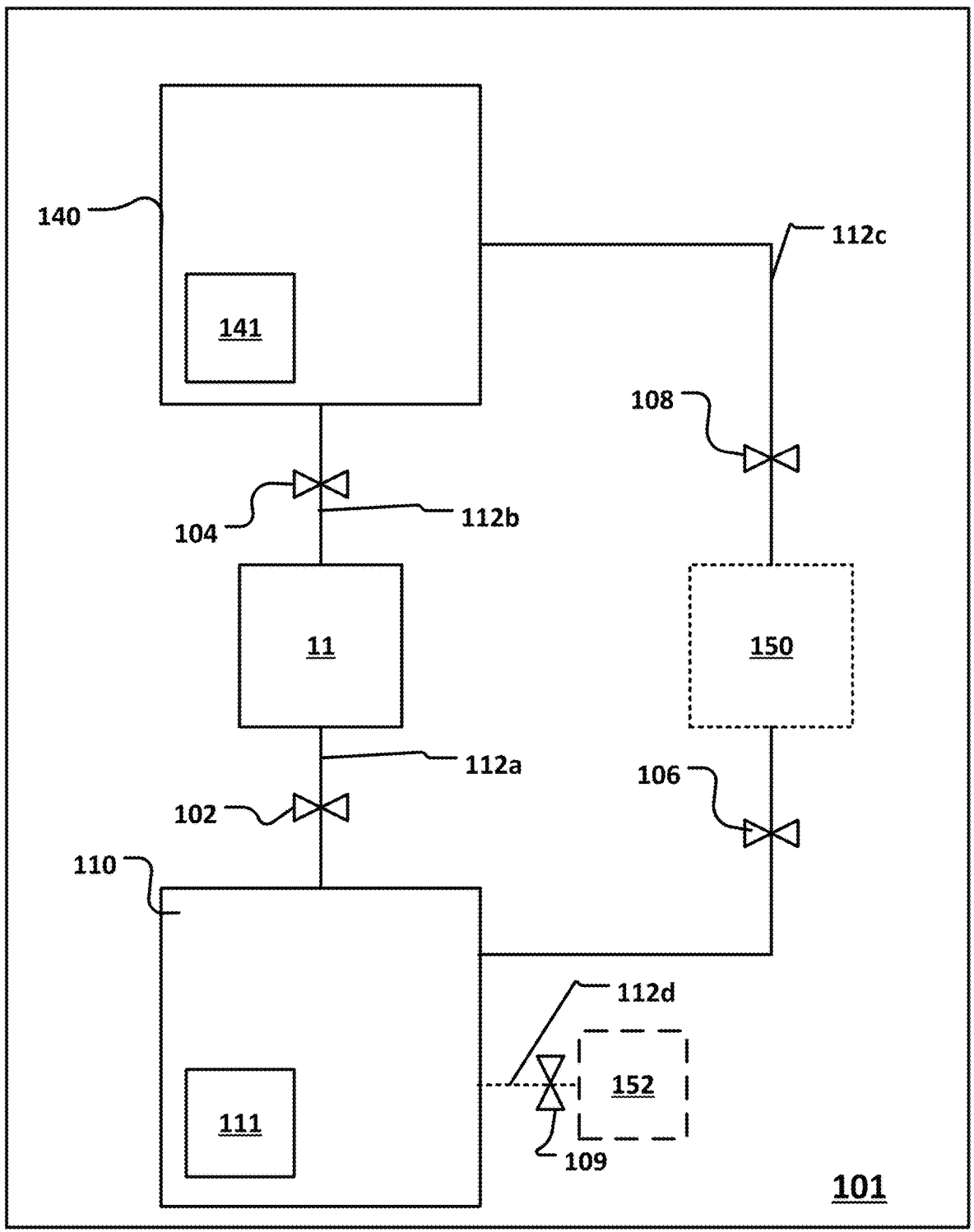
FIG. 1 is a schematic view of a known closed-loop extraction circuit.

According to a first aspect, the disclosure relates a method of operating an extraction system for recovering solvent from solvent-bearing mass. The method comprises (1) introducing, into an extraction vessel containing at least the solvent-bearing mass, a first heated fluid portion into a first input orifice of the extraction vessel, the first heated fluid portion having a first temperature that is at least equal to a first solvent boiling point temperature; (2) evaporating, by the first heated fluid portion, a first liquid solvent portion from the solvent-bearing mass, thereby producing a first solvent vapor portion; (3) collecting at least the first solvent vapor portion after exiting a first output orifice of the extraction vessel; and (4) at least substantially containing, during the collecting the at least the first solvent vapor portion step, the first heated fluid portion within the extraction vessel. One advantage is time efficiently removing residual solvent while at least substantially maintain separation between the heated fluid portion and the solvent vapor portion. It may be particularly advantageous for large-diameter extraction vessels in more evenly stripping residual solvent throughout the solvent-bearing mass, including the core of said mass.

In a first possible implementation form of the first aspect of the disclosure, the solvent-bearing mass including solvent-bearing biomass. Said biomass, after stripped of residual solvent is therefore safer to transport, dispose of, or use in a derivative product. In a second possible implementation form of the first aspect or the first implementation form, the method further comprises substantially maintaining the first heated fluid portion at at least the first temperature as the first heated fluid portion travels through at least a portion of the extraction vessel that contains the solvent-bearing mass. Maintaining the heated fluid portion at the first temperature may prevent, for example, premature condensation of the heated fluid portion. In liquid heated fluid embodiments, maintaining the heated fluid portion at the first temperature may be advantageous for continuing to thermally drive residual solvent from the extraction vessel.

In a third possible implementation form of the second implementation form, the substantially maintaining step comprising heating, during the evaporating the first liquid solvent portion step, at least one of the extraction vessel and an operably coupled extraction system component thereof for maintaining the first heated fluid portion at at least the first temperature.

In a fourth possible implementation form of the first aspect or any of the above implementation forms thereof, the at least substantially containing step comprises closing at least the first output orifice before the first heated fluid portion exits the extraction vessel. That can help substantially maintain the heated fluid portion within an extraction vessel. In a fifth possible implementation form of the first aspect or any of the above implementation forms thereof, the at least substantially containing step comprises condensing the first heated fluid portion and thereby producing a first liquid portion. This may help maintain the (formerly) heated fluid portion within an extraction vessel or allow for gravity-assisted draining of the condensed fluid portion. In a sixth possible implementation form of the fifth implementation form, the condensing step comprises at least one of increasing a pressure within the extraction vessel, decreasing a temperature within the extraction vessel, and condensing the first heated fluid portion by a cold trap that is arranged above and/or downstream of the extraction vessel.

In a seventh possible implementation form of the first aspect or any of the above implementation forms thereof, the method further comprising monitoring, by a controller, at least one of a pressure and temperature of the extraction vessel. In an eighth possible implementation form of the seventh implementation form, the monitoring step comprises measuring at least one extraction vessel temperature with at least one thermal sensor arranged on or in the extraction vessel. In some embodiments, a controller can use the measured temperature values to determine a vapor-pressure value or an average thereof. In a ninth possible implementation form of the seventh or eighth implementation forms, the monitoring step comprises monitoring a thermal gradient value across a length of the extraction vessel. In some embodiments, the gradient value may indicate the progress of the first heated fluid portion as it ascends or descends through an extraction vessel.

In a tenth possible implementation form of the seventh, eight, or ninth implementation forms, the first input orifice is arranged on or near a first end portion of the extraction vessel and the first output orifice is arranged on or near a second end portion of the extraction vessel, with the first and second end portion arranged on opposite ends of the extraction vessel. The monitoring step comprises monitoring, by the controller, at least a temperature of the second end portion of the extraction vessel. In some embodiments, the monitored temperature may indicate that the first heated fluid portion may be close to exiting an extraction vessel.

In an eleventh possible implementation form of the seventh, eight, ninth, or tenth implementation forms, the method further comprises at least substantially stopping, possibly by the controller, the introduction step in response to a first monitored value that is obtained from the monitoring step, the first monitored value comprising at least one of a first extraction vessel pressure value, a first extraction vessel temperature value, and a first extraction vessel thermal gradient value. One advantage may be substantially maintaining separation between the heated fluid portion and the solvent vapor portion by preventing the heated fluid portion from overflowing the extraction vessel.

In a twelfth possible implementation form of the seventh, eighth, ninth, tenth, or eleventh implementation forms, the method further comprises closing, possibly by the controller, the extraction vessel in response to a second monitored value that is obtained from the monitoring step, the second monitored value comprising at least one of a second extraction vessel pressure value, a second extraction vessel temperature value, and a second extraction vessel thermal gradient value. One advantage may be at least substantially maintaining separation between the heated fluid portion and the solvent vapor portion.

In a thirteenth possible implementation form of the first aspect or any of the above implementation forms, the method further comprises monitoring, possibly by the controller, a vapor pressure of the extraction vessel; and determining, possibly by a controller, if a monitored vapor pressure value indicates that residual solvent remains in the extraction vessel. If it is determined that residual solvent remains in the extraction vessel, the method further comprising (1) introducing a second heated fluid portion into the first input orifice or another input of the extraction vessel; (2) substantially maintaining the second heated fluid portion in vapor form as the second heated fluid portion travels through the extraction vessel; (3) evaporating, by the first heated fluid portion, a second liquid solvent portion from the solvent-bearing mass, thereby producing a second solvent vapor portion; (4) collecting at least the second solvent vapor portion after exiting the first output orifice of the extraction vessel; and (5) at least substantially containing the second heated fluid portion within the extraction vessel. One advantage is a thorough removing residual solvent.

In a fourteenth possible implementation form of the thirteenth implementation form, the method comprises sealing, possibly by a controller, the extraction vessel or a fluidly coupled path thereof before determining if the monitored vapor pressure value indicates that residual solvent remains in the extraction vessel. One advantage is isolating the extraction vessel when determining if residual solvent still remains in said vessel.

In a fifteenth possible implementation form of the first aspect or any of the above implementation forms thereof, the solvent-bearing mass comprises at least two solvents with differing boiling point temperatures, including the first solvent boiling point temperature and a second solvent boiling point temperature. The method further comprises (1) introducing a second heated fluid portion into the first input orifice or another input of the extraction vessel, the second heated portion being at a higher temperature than the first heated fluid portion and at least equal to the second solvent boiling point; (2) evaporating, by the second heated fluid portion, a second liquid solvent portion from the solvent-bearing mass, thereby producing a second solvent vapor portion; (3) collecting at least the second solvent vapor portion after exiting the first output orifice of the extraction vessel; and (4) at least substantially containing the second heated fluid portion within the extraction vessel. One advantage is the ability to evaporate selected solvent(s) at a time, in isolation (e.g., only butane) or in a particular "grouping" (e.g., butane and isobutane). Solvents can then be separately stored for later use, either individually or in sub-groupings, without further separation steps.

In a sixteenth possible implementation form of the first aspect or any of the above first through fourteenth implementation forms thereof, the solvent-bearing mass comprises at least two solvents with differing boiling point temperatures, including the first solvent boiling point temperature and a second solvent boiling point temperature that is higher than the first solvent boiling point temperature. The (1) introducing the first heated fluid portion step comprises introducing, into the extraction vessel, the first heated fluid portion into the first input orifice of the extraction vessel, the first heated fluid portion having the first temperature that is at least equal to the second solvent boiling point temperature; and the (2) evaporating step comprising evaporating, by the first heated fluid portion, the first liquid solvent portion from the solvent-bearing mass, thereby producing the first solvent vapor portion that comprises the at least two solvents. One advantage is the ability to evaporate a group of solvents in a time-efficient manner.

In a seventeenth possible implementation form of the first aspect or any of the above implementation forms thereof, the introducing the first heated portion step comprising introducing, into the extraction vessel, a first heated vapor portion into the first input orifice of the extraction vessel.

In an eighteenth possible implementation form of the first aspect or any of the above implementation forms thereof, the method further comprises evacuating, before introducing the first heated fluid portion, a solvent-solute mixture from the extraction vessel while retaining the solvent-bearing mass within the extraction vessel.

In a nineteenth possible implementation form of the first aspect or any of the above implementation forms thereof, the method further comprises evacuating, after at least the evaporating the first liquid solvent portion step, at least one of the first heated portion and a liquid portion thereof from the extraction vessel. In a twentieth possible implementation form of the nineteenth implementation form, the evacuating the first heated portion step comprises heating, after at least the evaporating the first liquid solvent portion step, the extraction vessel to at least a fluid portion boiling point for evaporating at least one of the first heated fluid portion and the liquid portion thereof.

In a twenty-first possible implementation form of the first aspect or any of the above implementation forms thereof, the first heated fluid portion comprises at least one of a heated gas, heated CO2, heated liquid water, and water vapor. In a twenty-second possible implementation form of the first aspect or any of the above implementation forms, the solvent-bearing mass comprises at least one of ethane, propane, ammonia, water, xenon, methanol, ethanol, 1-propanol, 2-propanol, 1-hexanol, 2-methoxy ethanol, tetrahydrofuran, 1,4-dioxane, acetonitrile, methylene chloride, dichloroethane, chloroform, ethyl acetate, propylene carbonate, N,N-dimethylacetamide, dimethyl sulfoxide, formic acid, carbon disulfide, acetone, toluene, hexanes, pentanes, trifluoromethane, nitrous oxide, sulfur hexafluoroide, butane, isobutane, ethyl ether, benzotrifluoride, (p-chlorophenyl) trifluoromethane, chlorofluorocarbon (CFC), hydrofluorocarbon, HFA-134a, terpenes, terpenoids, or a mixture thereof.

According to a second aspect, the disclosure relates to a method of thermally regulating an extraction vessel. The method comprises (1) introducing, into the extraction vessel containing at least a solvent-bearing mass, a first thermally regulated fluid portion into a first plurality of input orifices of the extraction vessel, each of the first plurality of input orifices partially defining an extraction vessel channel for transporting fluid along a length of the extraction vessel without the thermally regulated fluid contacting the solvent-bearing mass; and (2) thermally regulating, by the first thermally regulated fluid portion, a first liquid solvent portion in contact with the solvent-bearing mass. One advantage may be an "internal" thermal regulator, which may be able to thermally regulate the core of a solute- and/or solvent-bearing mass in, for example, a large-diameter extraction vessel. Said thermal regulation may occur before, during, or after solute extraction within the extraction vessel.

According to a third aspect, the disclosure relates to a method of recovering solvent from solvent-bearing mass. The method comprises (1) introducing, into an extraction vessel containing at least the solvent-bearing mass, a first heated fluid portion into at least a first input orifice of the extraction vessel, the first heated fluid portion having a first temperature that is sufficient to establish or increase a pressure within the extraction vessel; (2) moving, by the first heated fluid portion, at least a first liquid solvent portion from the solvent-bearing mass, thereby producing a first evacuated solvent portion; (3) collecting at least the first evacuated solvent portion after said portion exits a first output orifice of the extraction vessel; and (4) at least substantially containing, during the collecting the at least the first evacuated solvent portion step, the first heated fluid portion within the extraction vessel. One advantage may be removing residual solvent at relatively lower temperatures by relying on thermally driving the residual solvent out of the extraction vessel.

According to a fourth aspect, the disclosure relates to an extraction vessel comprising an elongated vessel defining at least a first exterior shape and an interior cavity; and a plurality of protrusions that (A) are arranged within the elongated vessel, (B) extend into the cavity, and (C) are thermally coupled to the elongated vessel. In a first possible implementation form of the fourth aspect, the plurality of protrusions comprises a plurality of fins that (A) are arranged within the elongated vessel, (B) extend into the cavity, and (C) are thermally coupled to the elongated vessel.

One advantage may be an "internal" thermal regulator, which may be able to thermally regulate the core of a solute- and/or solvent-bearing mass in, for example, a large-diameter extraction vessel.

In a second possible implementation form of the fourth aspect or first implementation form, the plurality of protrusions each substantially span a length of the elongated vessels. In a third possible implementation form of the fourth aspect or the above implementation forms thereof, each of the plurality of protrusions are mechanically coupled to the elongated vessel. One advantage may include selecting different materials for the protrusions than for the extraction vessel exterior.

In a fourth possible implementation form of the fourth aspect or the above implementation forms thereof, the extraction vessel further comprises a thermal jacket that is thermally coupled to at least the plurality of protrusions. In a fifth possible implementation form of the fourth implementation from, the thermal jacket mechanically couples to an exterior portion of the elongated vessel. In a sixth possible implementation form of the fourth or fifth implementation forms, the thermal jacket is one of a liquid jacket and an electric jacket.

In a seventh possible implementation form of the fourth aspect or the above implementation forms thereof, the plurality of protrusions each comprise one or more heating elements. In an eighth possible implementation form of the fourth aspect or the above implementation forms thereof, the plurality of protrusions each comprise one or more resistive heating elements.

In a ninth possible implementation form of the fourth aspect or the second through sixth implementation forms thereof, the plurality of protrusions each define a cavity for transporting a heating fluid and/or cooling fluid across a length of the extraction vessel.

In a tenth possible implementation form of the fourth aspect or the above implementation forms thereof, the plurality of protrusions each comprise a ferrous material. One possible advantage is the ability to utilize an inductive heating source to heat the plurality of protrusions.

According to a fifth aspect, the disclosure relates to an extraction vessel system that comprises any one of the extraction vessels of the third aspect and implementation forms thereof. The system further comprises an extraction vessel cartridge adapted to hold a source material for extraction, with the cartridge dimensioned and defining a complementary shape and thereby configured to slide into the extraction vessel.

According to a sixth aspect, the disclosure relates to an extraction vessel system that comprises any one of the extraction vessels of the third aspect and implementation forms thereof besides the fourth through sixth implementation forms. The system further comprises a thermal jacket operably coupled or integral with the extraction vessel, the thermal jacket arranged to be thermally coupled with or otherwise heat at least the protrusions.

According to a seventh aspect, the disclosure relates to an extraction vessel system that comprises an extraction vessel and an extraction vessel cartridge. The extraction vessel cartridge comprises a ferrous material and is adapted to hold a source material for extraction. The cartridge is dimensioned and defines a complementary shape and is thereby configured to slide into the extraction vessel. One possible advantage is the ability to utilize an inductive heating source to heat the cartridge, inside the extraction vessel, for the thorough removal of residual solvent.

According to an eighth aspect, the disclosure relates to an extraction system that comprises a controller that is configured or configurable to perform at least any one method of the first aspect and implementation forms thereof.

DETAILED DESCRIPTION

The disclosed methods and systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation may not be individually described in the following detailed description.

Throughout the following detailed description, examples of various systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

As used herein, "thermal elements" include elements for applying at least one of heat or cooling to an object such as thermoelectric elements (e.g., Peltier devices), thermal liquid jackets (e.g., water jackets), heating elements (e.g., inductive and other resistive heating elements, pads, heaters, stoves), and electric jackets.

Unless otherwise noted, a dotted line that connect two or more extraction system components in the figures generally signifies one or more fluid communication paths between or among said two or more extraction system components. Fluid lines, pumps, valves, and/or further extraction system components may be arranged along said fluid communication path and may be omitted in the figures for sake of clarity and highlighting inventive aspects. Further, multiple dotted lines between extraction components do not necessarily indicate multiple physical lines arranged between components, but rather different fluids such as solvent, solvent mixtures, solvent-solute mixtures, and/or a heated fluid may share one or more lines.

Extraction system components in "fluid communication" means that a fluid can at least flow from one extraction system component to the other. Extraction system components can still be in fluid communication even with intervening pumps, valves, and/or further extraction system components (e.g., a separator). "Selective fluid communication" means that a fluid connection may be selectively established via, for example, a fluid connector (e.g., valves, manifolds, and the like). "Fluid connector" may include one or more valves such as one-, two, three-, four-way valve(s) and/or manifolds, which generally include a plurality of valves.

One advantage for various large-diameter (e.g., around twelve inches or larger) extraction vessels is the thorough removal of residual solvent, thereby decreasing solvent loss and providing a safer by-product (e.g., a mass after extraction and residual solvent removal) for transport, disposal, or even as a source for another product. Another possible advantage is a more flexible solvent-removal process, in which solvent may be selectively evaporated at particular temperatures occurring within the extraction vessel. In some embodiments, a heated fluid may be of a sufficient temperature to evaporate a plurality or sub-plurality of solvents having differing boiling points.

A further possible advantageous example is monitoring for subsequent pressure signatures or changes within the extraction vessel or elsewhere in a fluidly coupled line of one or more extraction system components. Said pressure signature is generally indicative of the mass still containing residual solvent after at least a first residual-solvent removal step.

A further advantage is substantially maintaining the heated fluid (that evaporates or otherwise displaces the one or more solvents) within the extraction vessel, or additionally or alternatively, arranging a cold trap downstream, with respect to the flow direction of the heated fluid, of the extraction vessel for condensing a heated vapor and thereby preventing a heated vapor from entering a further extraction system component. In some embodiments, said condensed fluid (i.e., formerly the heated vapor) returns, with the assistance of gravity, back into the extraction vessel. In cold trap embodiments, the (formerly) heated fluid is "substantially maintained" within the extraction vessel as said heated fluid (or a portion thereof) only briefly exits the extraction vessel before returning in liquid form.

As shown by FIG. 1, extraction system 101 includes first tank 110, second tank 140, extraction column 11, and an optional pump 150. Solvent line 112a and valve 102 are arranged between first tank 110 and extraction column 11. Liquid mixture line 112b and valve 104 are arranged between extraction column 11 and second tank 140. Solvent recapture line 112c, valves 106 and 108, and pump 150 are arranged between second tank 140 and first tank 110. Pressure source 152 (e.g., an optional tank or optional compressor) can provide or add pressure to first tank 110 by providing a pressurized gas, via line 112d and valve 109 for moving or assisting in moving solvent from first tank 110 to extraction column 11.

Thermal elements 111 and 141 are respectively thermally coupled to first tank 110 and second tank 140. Thermal elements 111 and 141 may be removably coupled and/or directly mechanically coupled to the exterior of its respective tank. In one example, thermal elements 111 and 141 are fluid jackets that are respectively welded to first tank 110 and second tank 140. Thermal elements 111 and 141 may heat and/or cool their respective first and second tanks 110 and 140.

Figure 3:
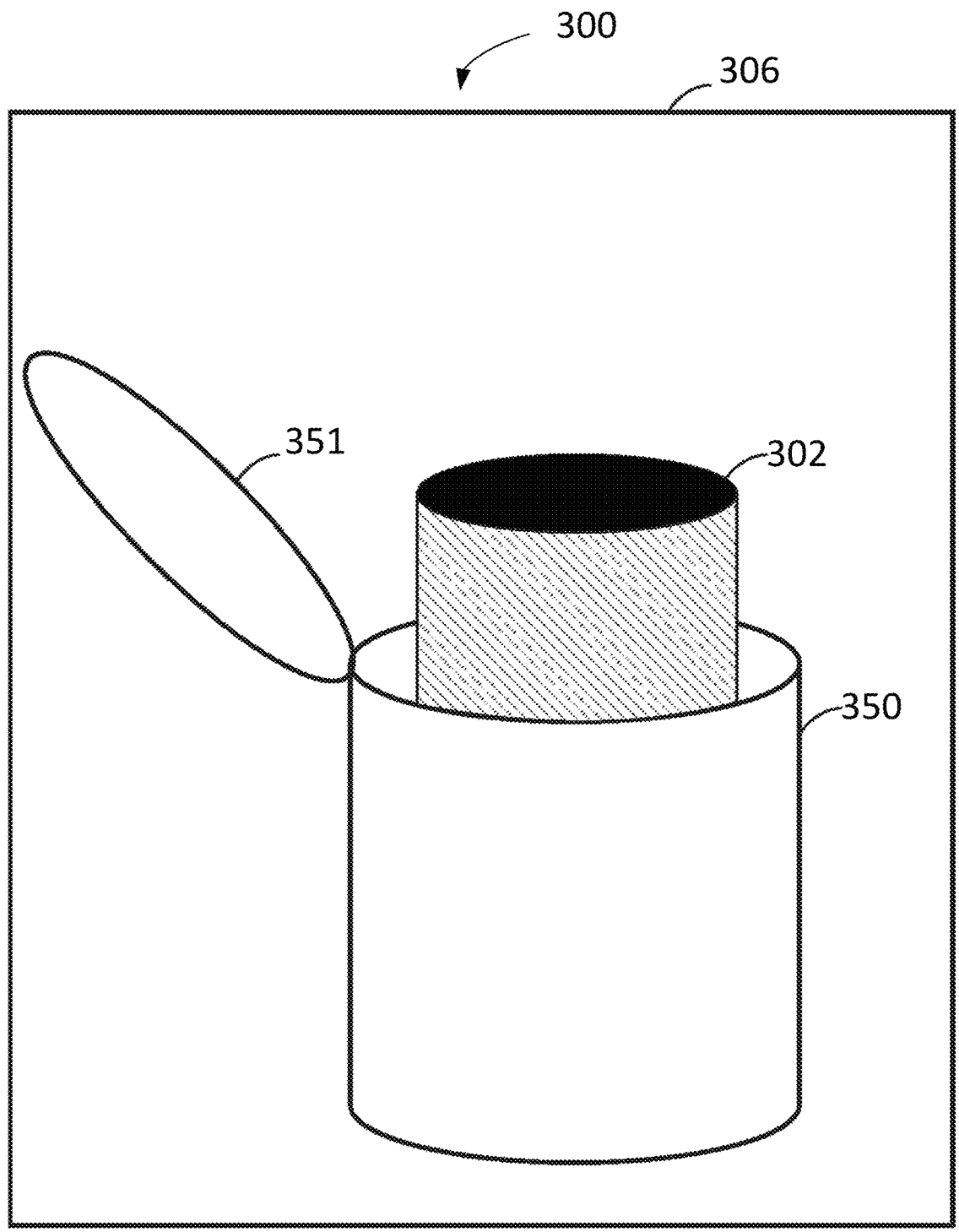
FIG. 3 is a schematic view of a known extraction vessel system.

FIG. 3 is a schematic view of example extraction system 300, which includes support structure 306, extraction cartridge 302, extraction vessel 350, and extraction vessel lid 351, which is mechanically couplable to vessel 350 for removing cartridge 302 and establishing a seal for vessel 350. Vessel 350 is generally fixed to support structure 306, but may be removeable via tools for replacement or maintenance. Cartridge 302 may be, for example, a rigid mesh "basket" or a deformable mesh "bag" that contains the source material. One example of cartridge 302 is a wire-mesh basket. In some examples, the outer surface of said wire-mesh basket is coated with silicon for directed solvent towards the mass held therein.

Thermal elements may include electric jackets, which may include deformable material for wrapping around an extraction system component and/or may be pads arranged to abut one side of an extraction system component, such as the bottom side of a separator vessel. FIGS. 4, 5-1, and 5-2 show a prior art extraction system and electric heating jackets. Solvent vessel 402 is fluidly coupled to extraction vessel 404 with line 403. Both vessels 402 and 404 have an electric heating jacket, respectively electric heating jackets 406 and 408. The "back" side of jacket 408 is shown, which includes straps 408a engaged with buckle 408b for snugly coupling the deformable material of jacket 408 with the outer surface of vessel 404.

Figure 2:
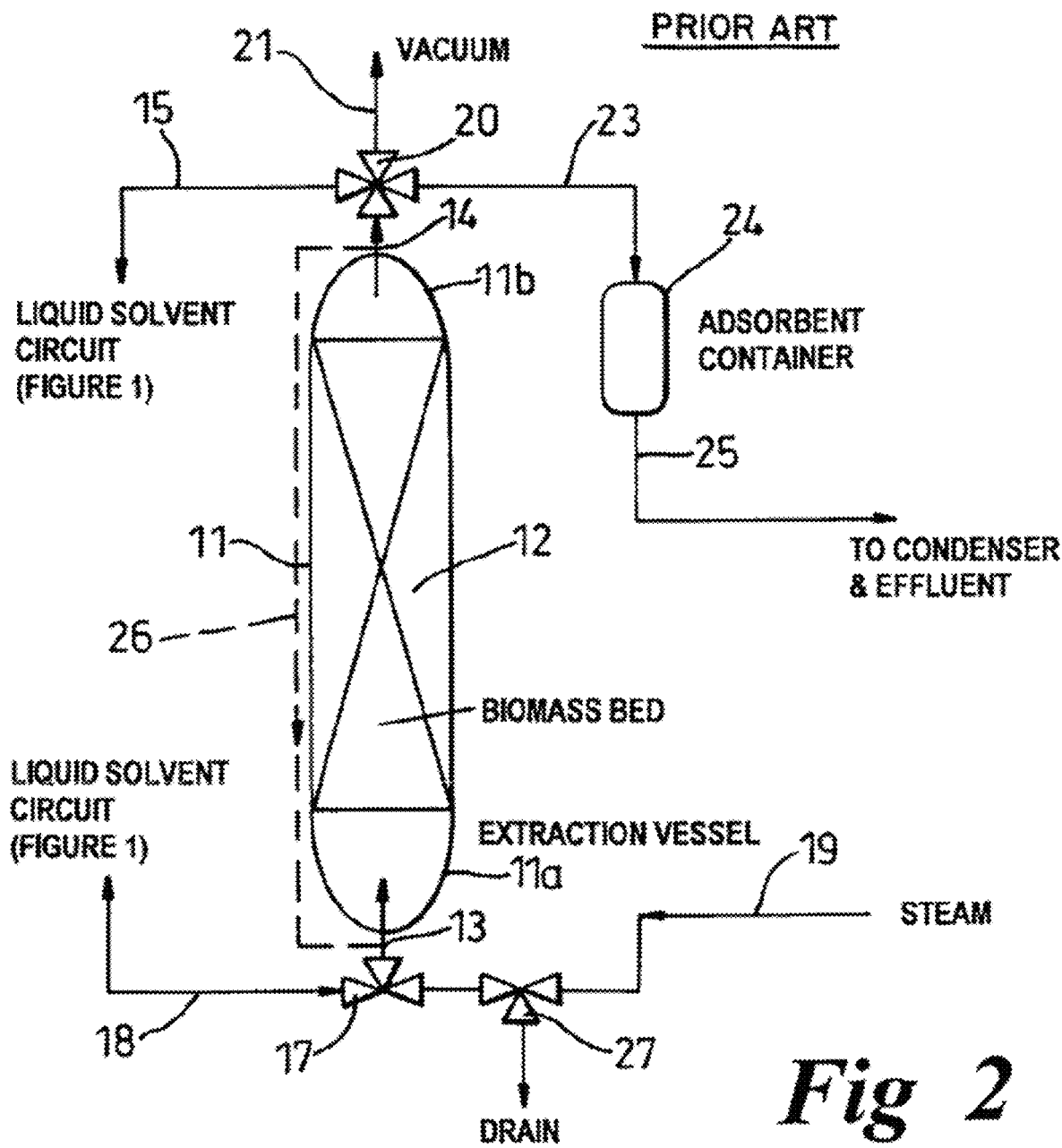
FIG. 2 is a schematic view of a known apparatus for removing residual solvent from a solvent-bearing biomass.
Figures 1, 8:
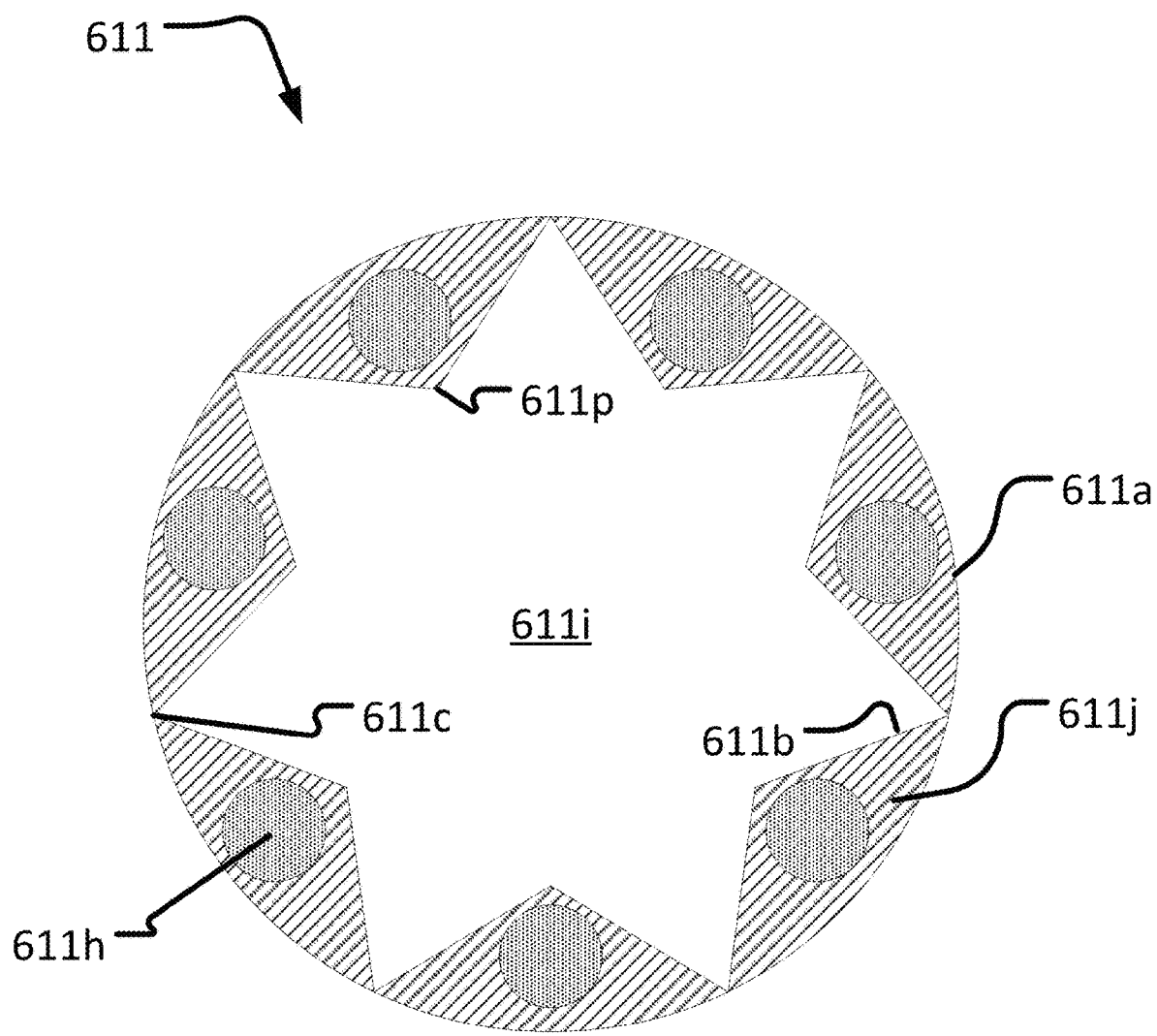
Figures 2, 8:
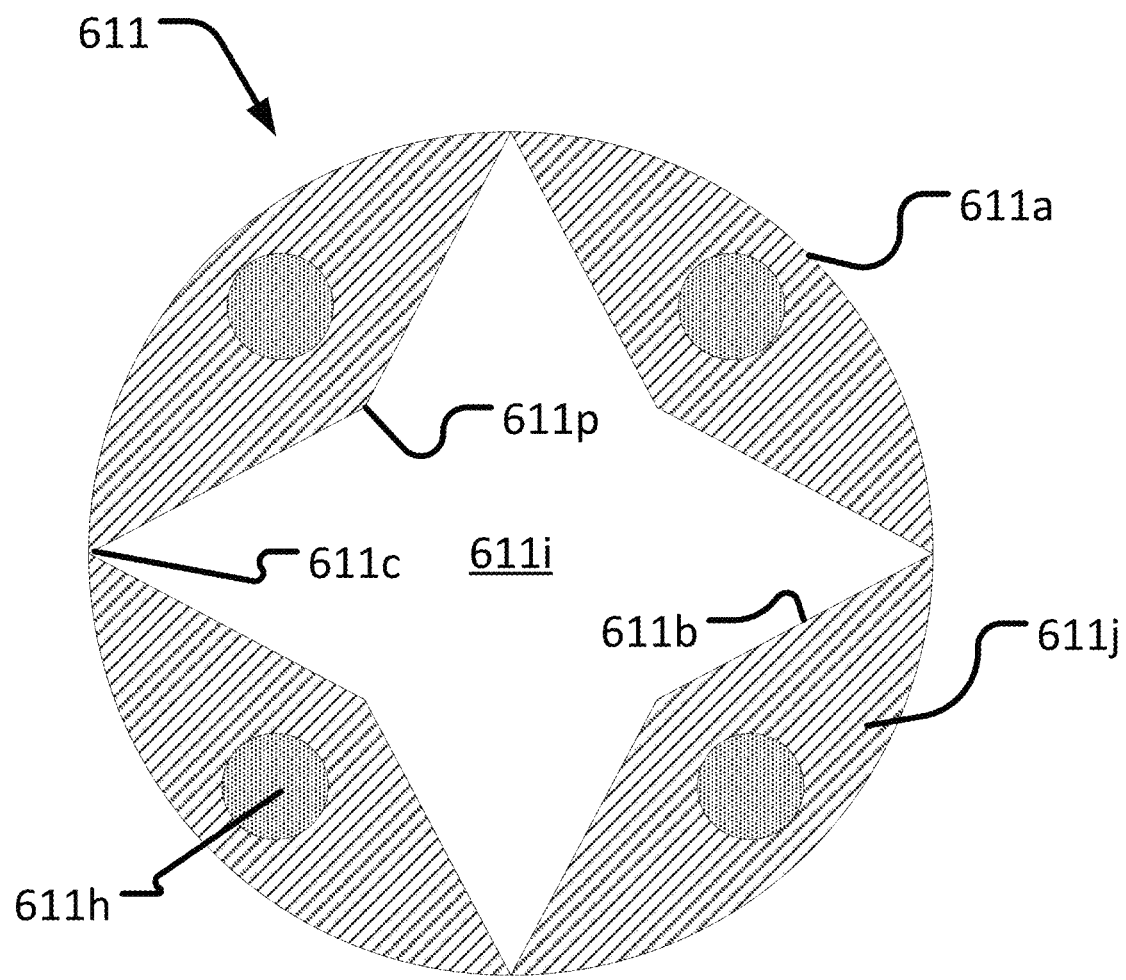
Figures 3, 8:
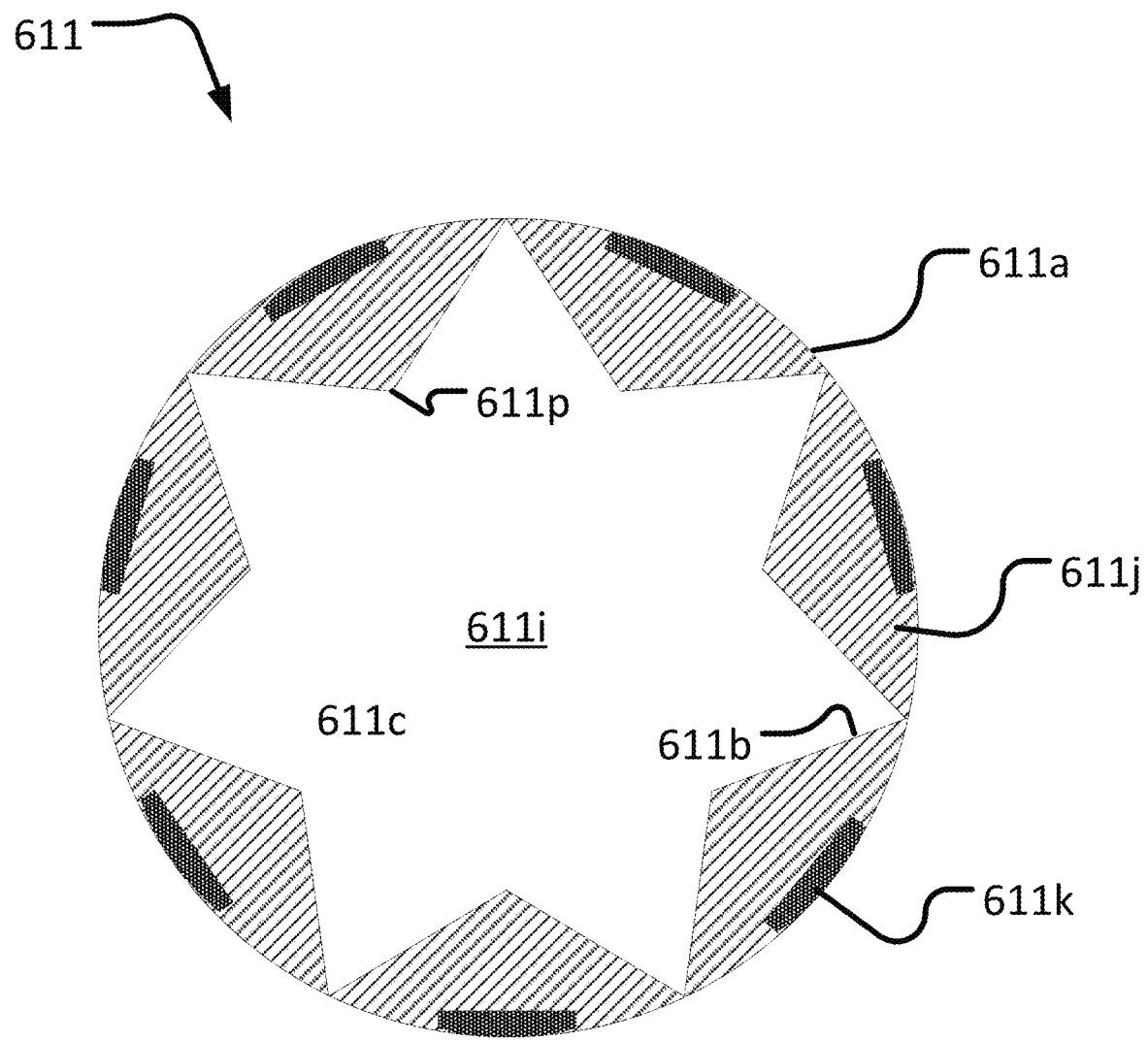
Figures 4, 8:
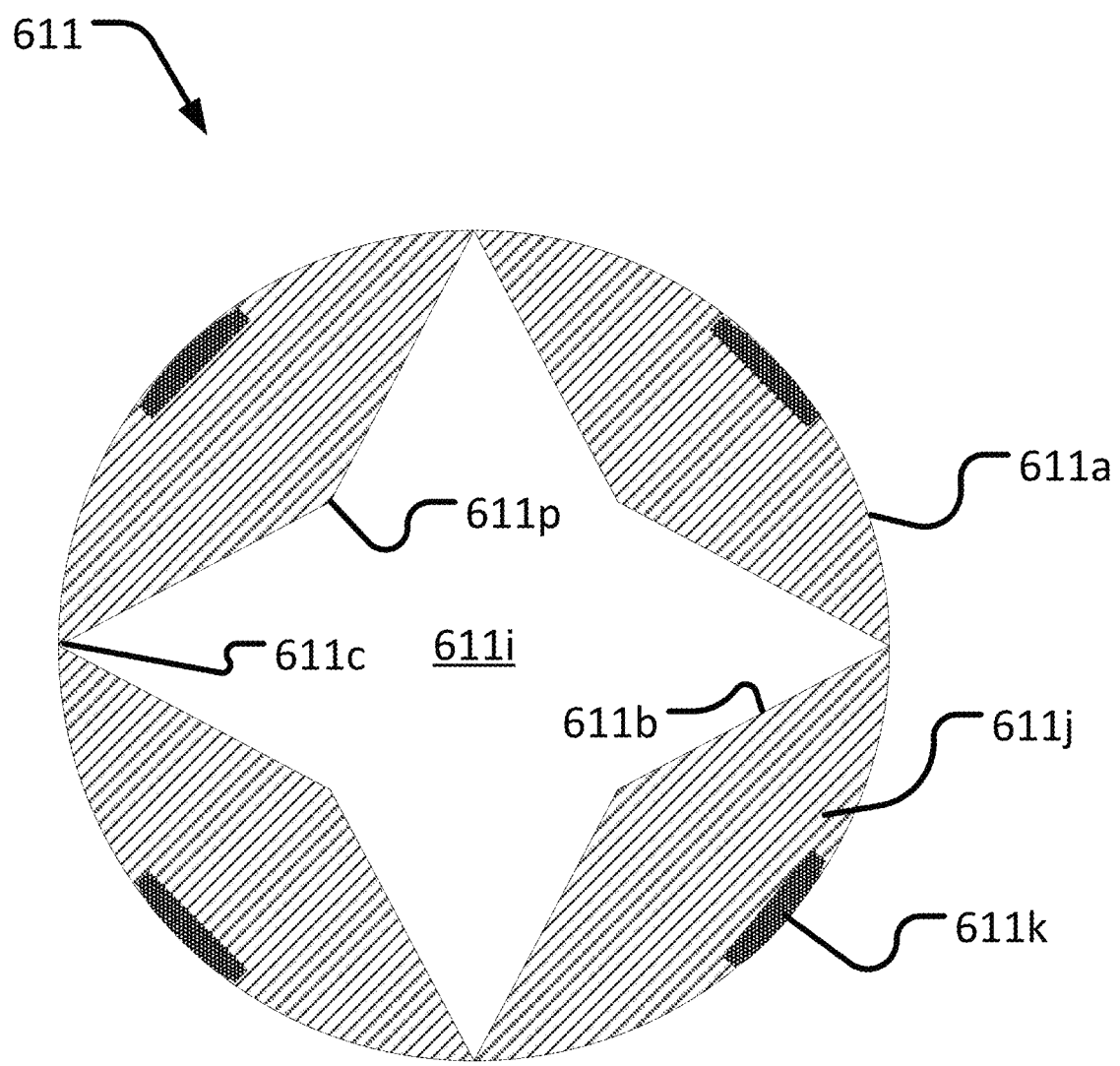
Figures 5, 8:
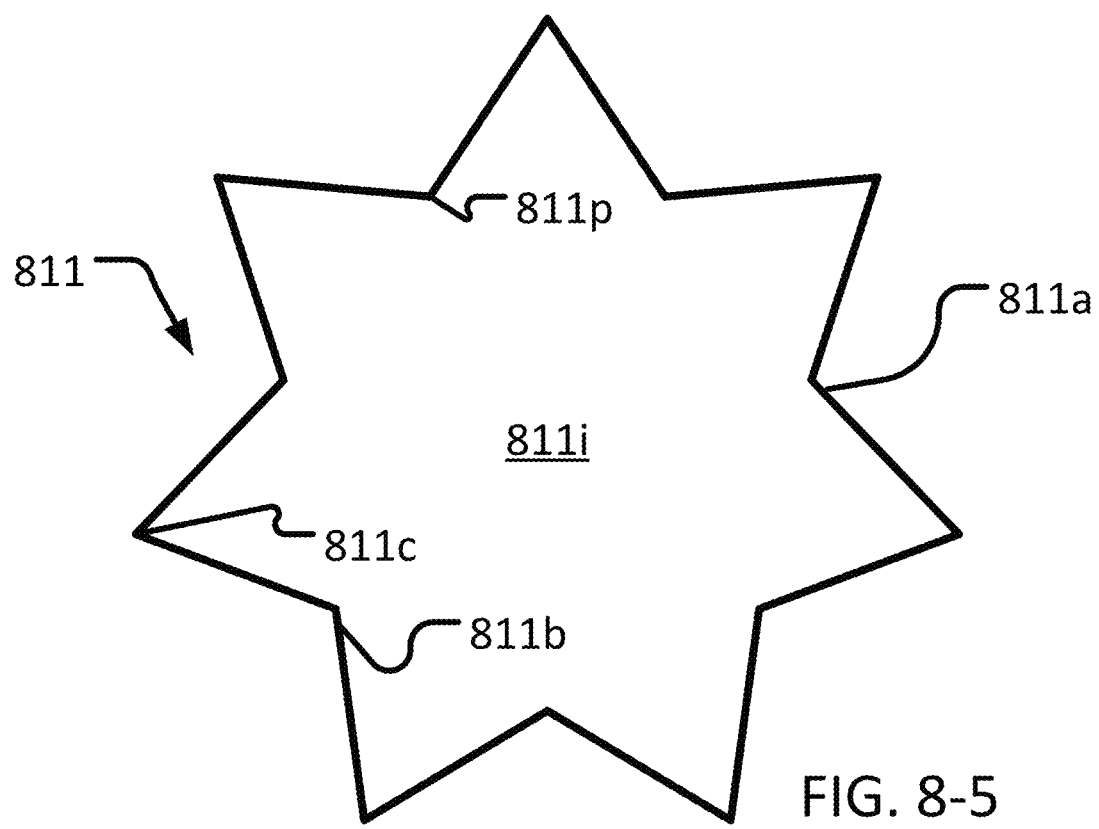
Figures 6, 8:
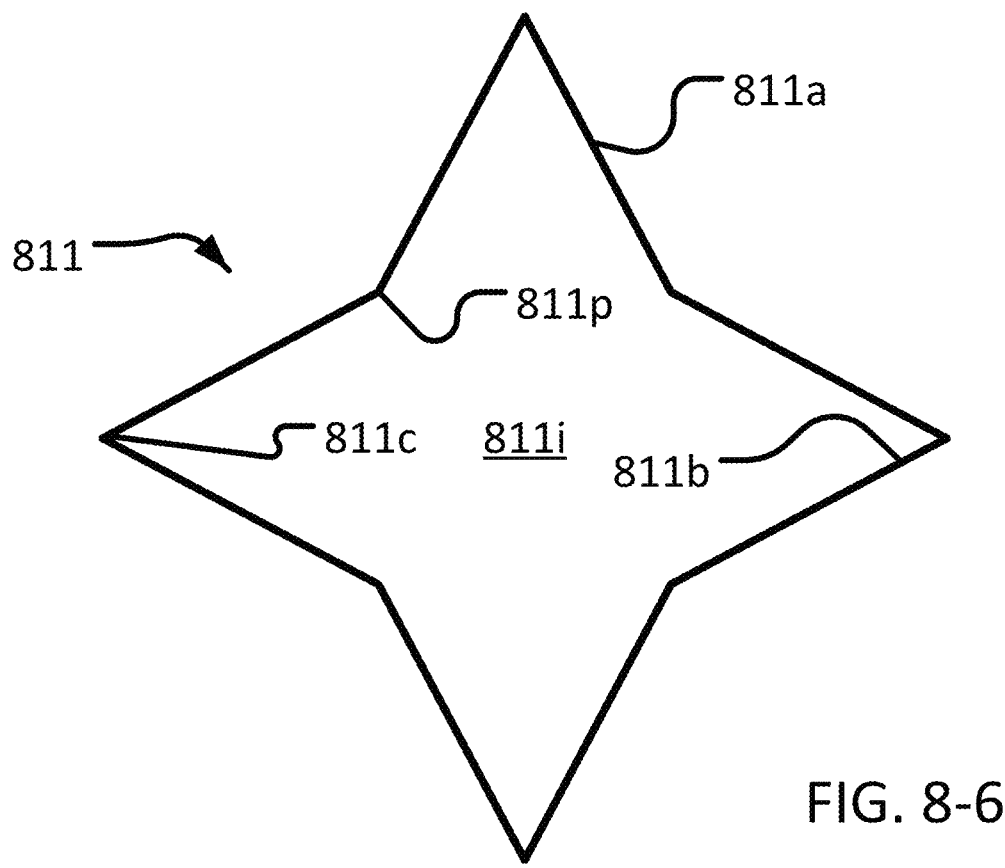
Figures 7, 8:
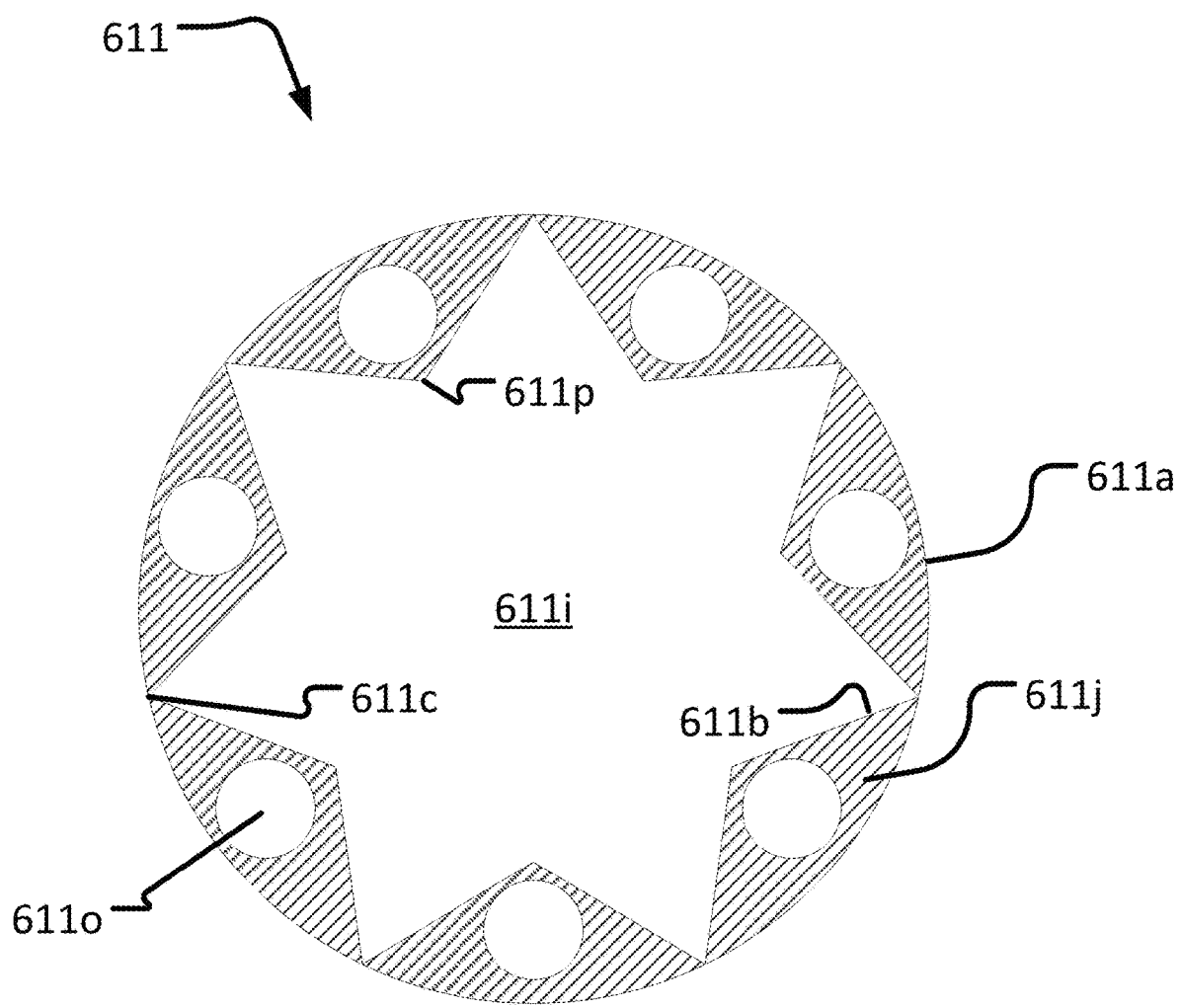
Figure 8:
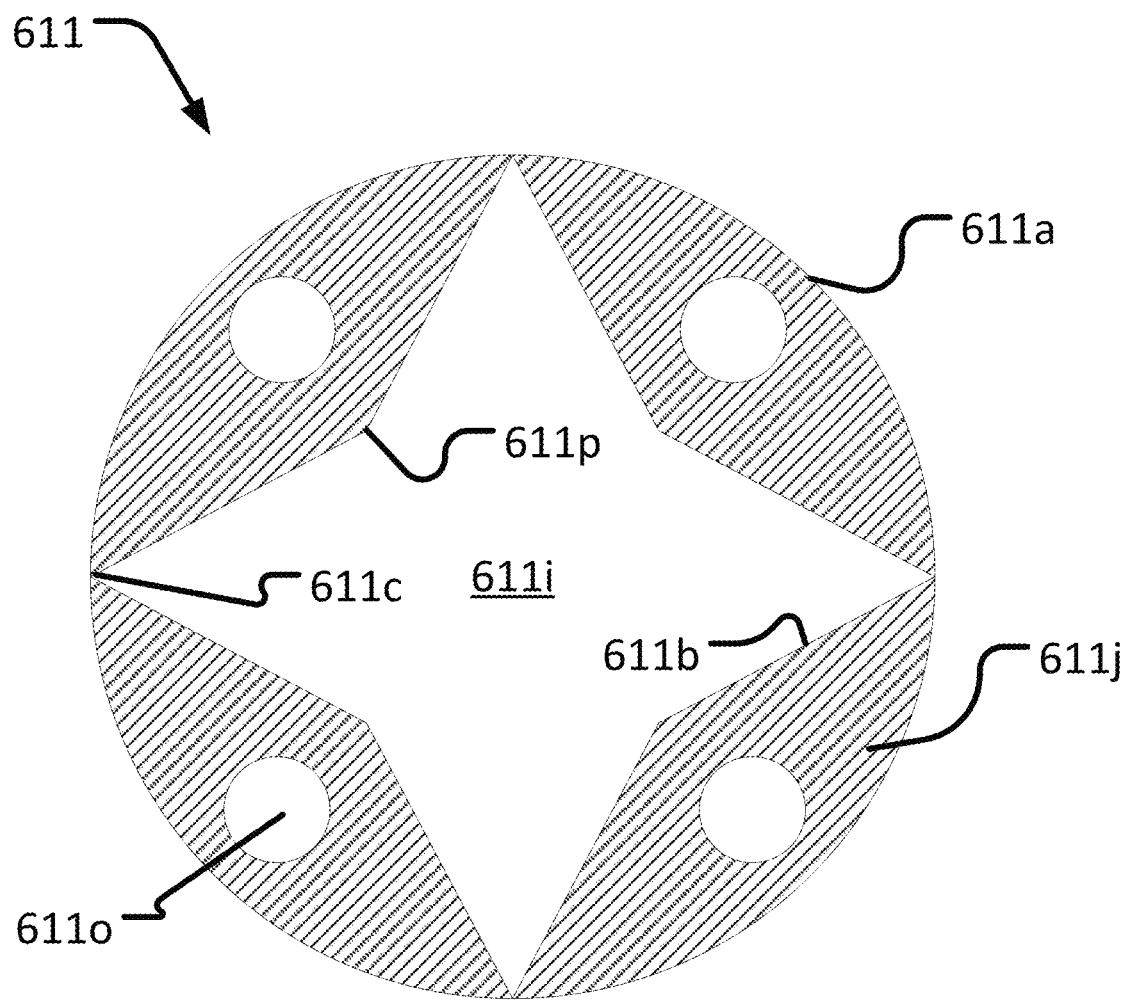

FIG. 5-1 shows electric heating jacket 506 with straps 508 in a cylindrical form on its own, without an extraction system component such as a solvent or extraction vessel. FIG. 5-2 shows the jacket "flattened out" to show the deformable quality of jacket 506. Straps 508 may couple with buckles (not shown), Velcro, or other coupling structures for snugly coupling jacket 506 to an extraction system component.

Figure 6:
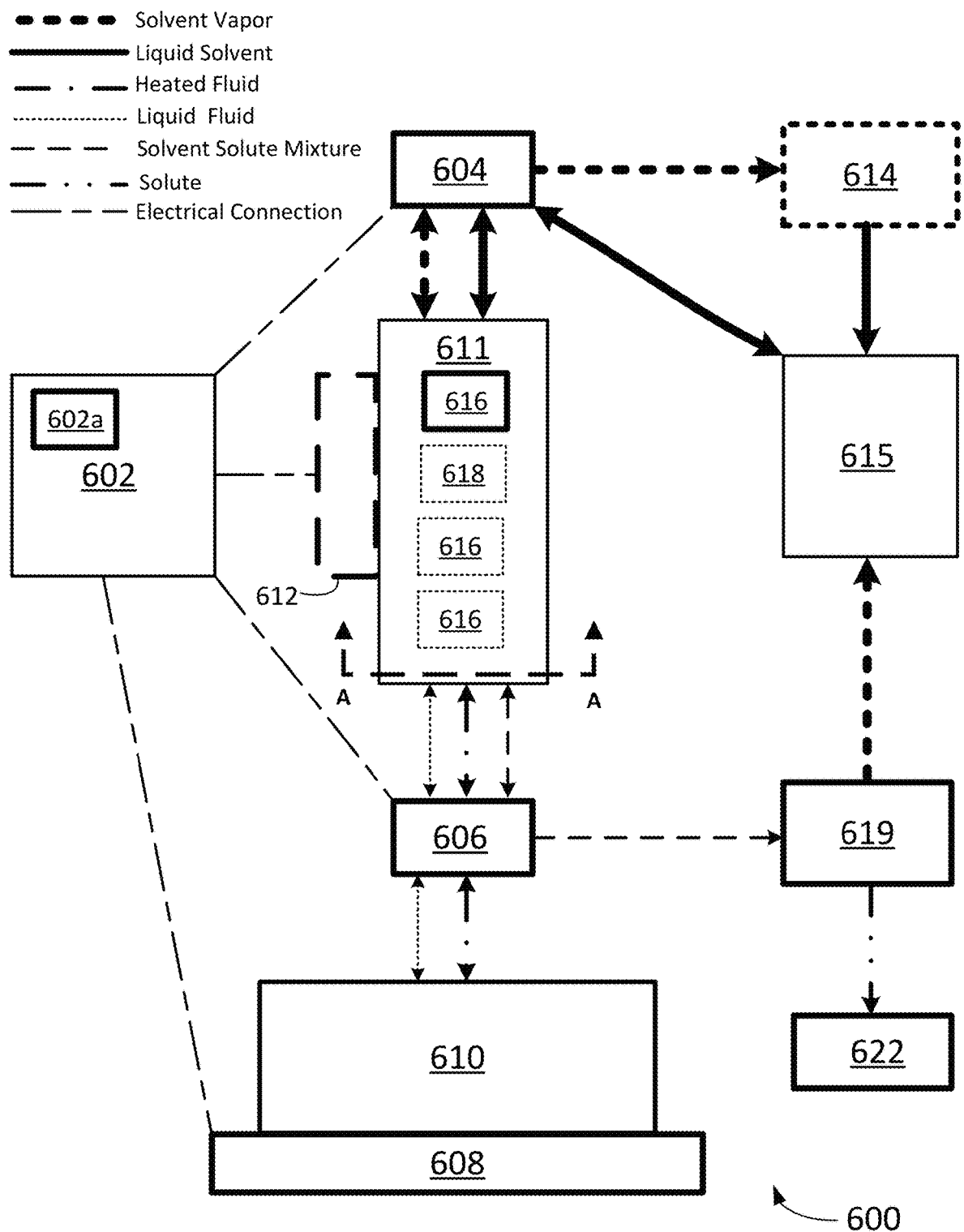
FIG. 6 is a schematic view of an extraction system.

FIG. 6 shows extraction system 600, which shows controller 602 operably coupled to memory 602a, fluid connectors 604 and 606, and at least one thermal sensor 616. The electrical connections among controller 602, thermal sensor 616, and pressure sensor 618 are not shown for overall clarity of FIG. 6. Example operable connections may be wired or wireless electrical coupling (e.g., USB, Ethernet (e.g., IEEE 802.3), IEEE 802.11, Bluetooth). Alternatively or additionally, controller may be operably connected to fluid connectors 604 and 606 via a pneumatic connection(s) in order to avoid bringing electrical signals near the extraction process.

Sensor(s) 616 may be arranged on and/or within extraction vessel 611. Sensors 616 and/or 618 may be arranged within vessel 611 as probe sensors. In multiple thermal sensor embodiments, sensors 616 may be arranged along a length of extraction vessel 611 and thereby measuring, for example, thermal gradients along said length and other location-related temperature values. In such embodiments, sensors 616 may provide measurements at different local areas for tracking the progress of a heated fluid as it travels through extraction vessel 611 for thermally moving solvent via a heated liquid or vapor. Controller 602 can thereby "track" or monitor the progress of the heated fluid from heated fluid source 610.

Heated fluid source 610 may be a tank or other vessel that is thermally coupled to heating element 608, which may be operably coupled to controller 602 for controlling the application of heat to source 610.

Solvent source 615 may provide solvent to the top, side, and/or bottom of vessel 611 for extraction. FIG. 6 shows solvent source 615 arranged to fluidly communicate solvent to vessel 611 via connector 604 to "top-fill" said vessel 611, but bottom-filling and side-filling may occur additionally or alternatively.

After an extracting time period, the resultant solvent-solute mixture may be evacuated out of vessel 611, to separator 619 for separating solute from solvent. The solute may then flow to extract container 622 and solvent vapor to source 615 or to another solvent container.

After a solvent-solute evacuation step, a solvent-bearing mass remains in vessel 611.

Controller 602 may direct a heated fluid (liquid or gas) from heated fluid source 610 to vessel 611 via fluid connector 606. Controller 602 may then monitor the progress of the heated fluid. Said heated fluid may alternatively be introduced via a side or top of extraction vessel 611.

Figure 10:
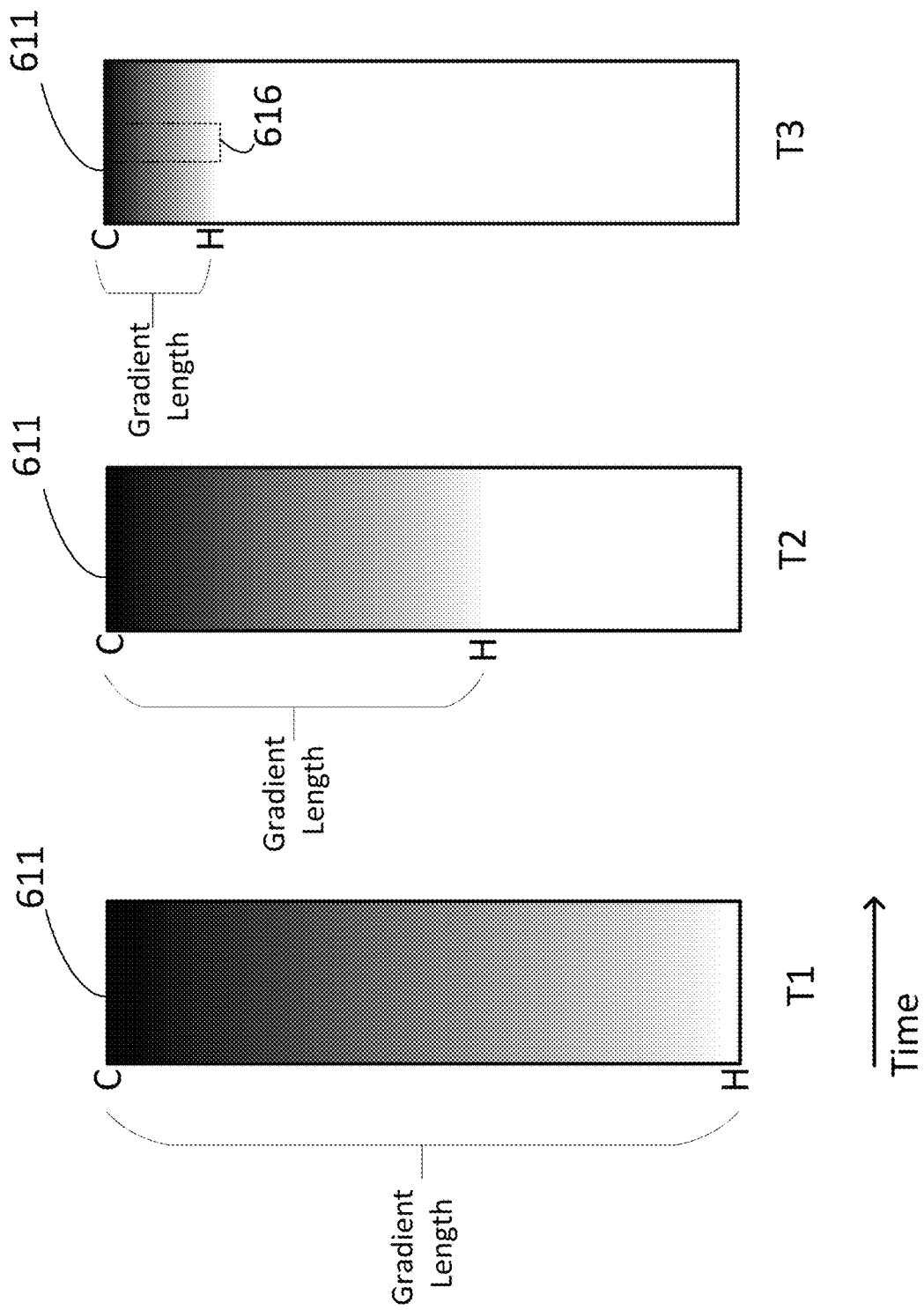
FIG. 10 is an extraction vessel schematic diagram showing different stages of residual solvent removal.
Figures 1, 11:
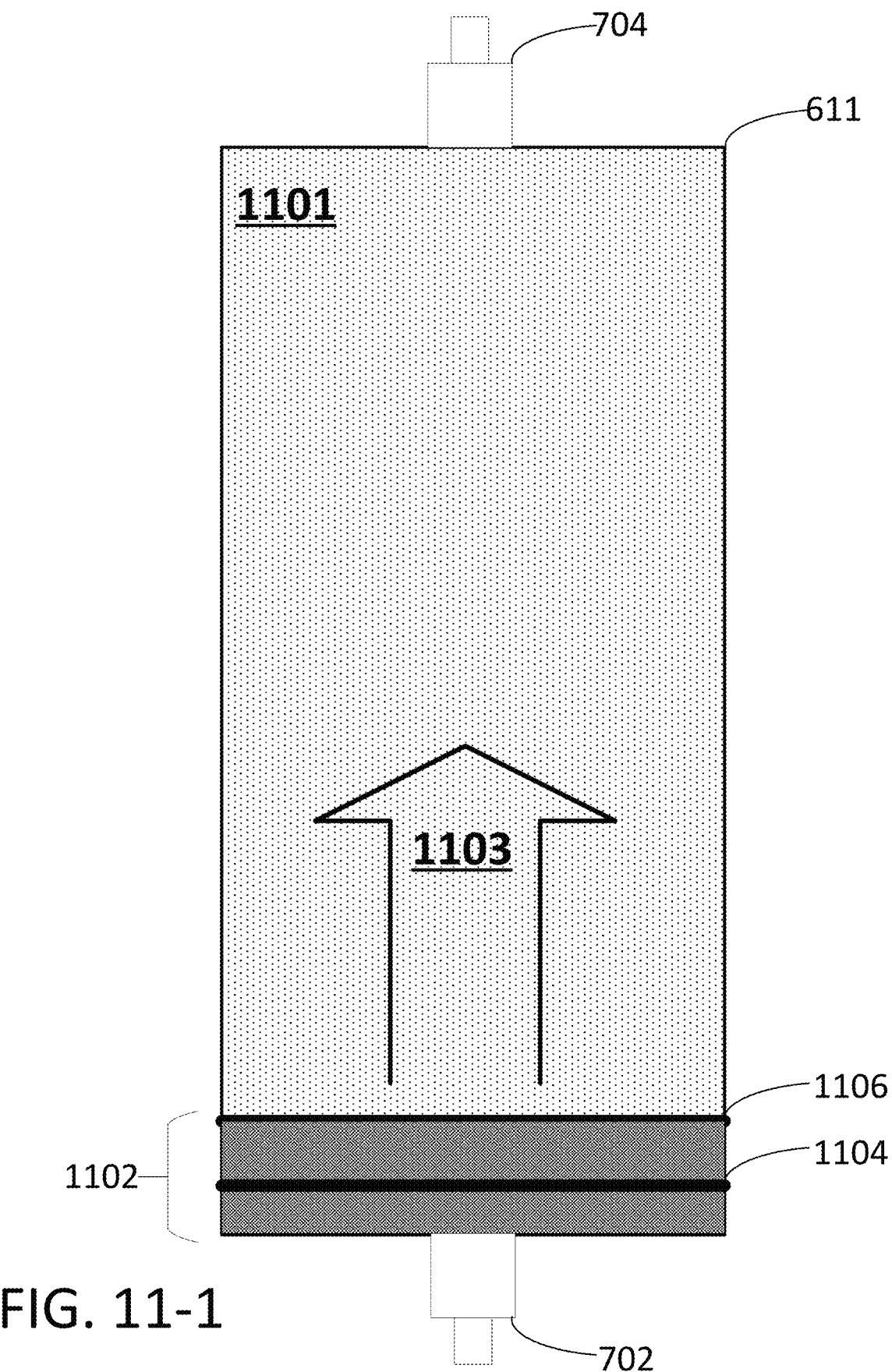
Figures 2, 11:
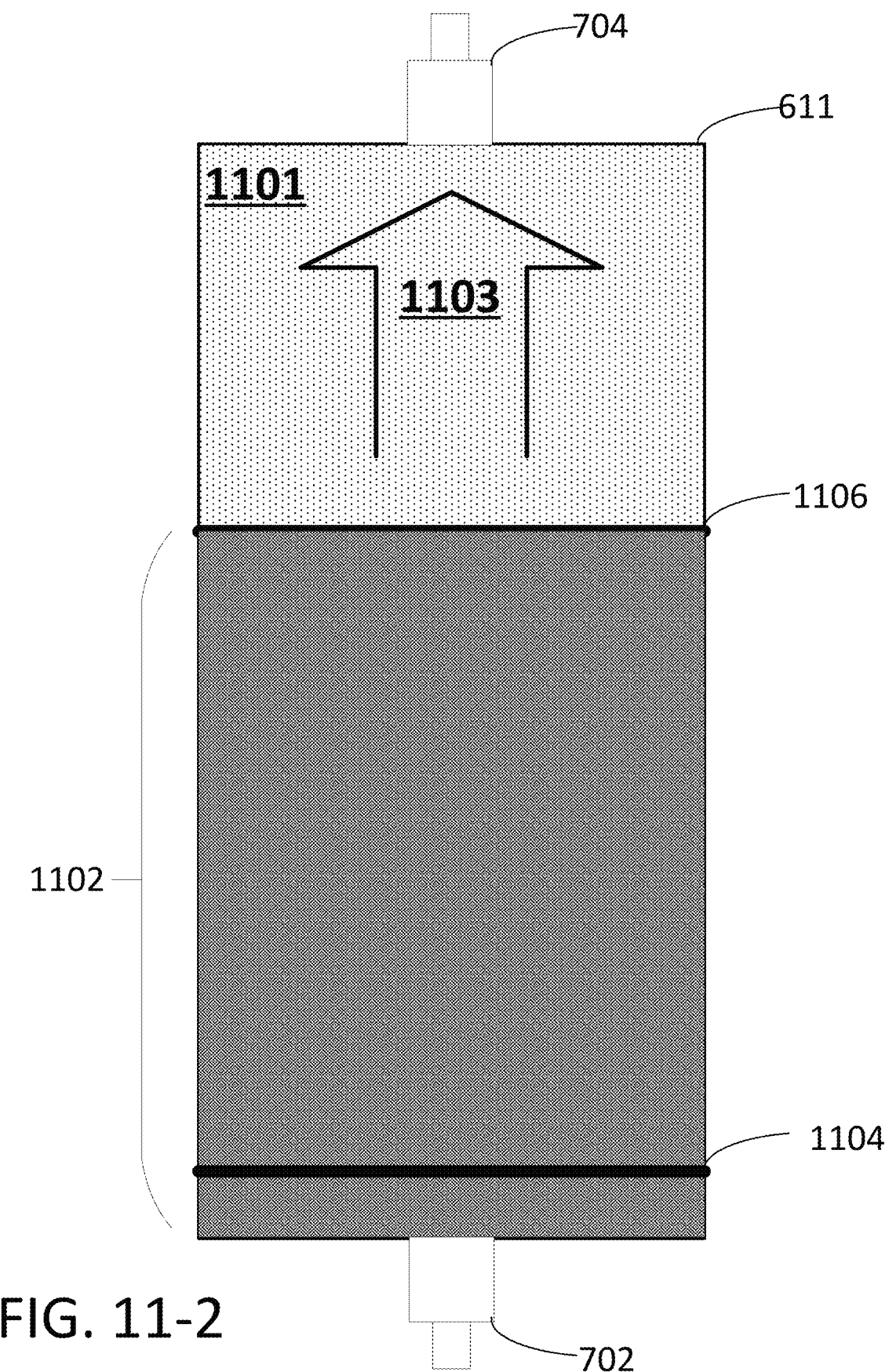
Figures 3, 11:
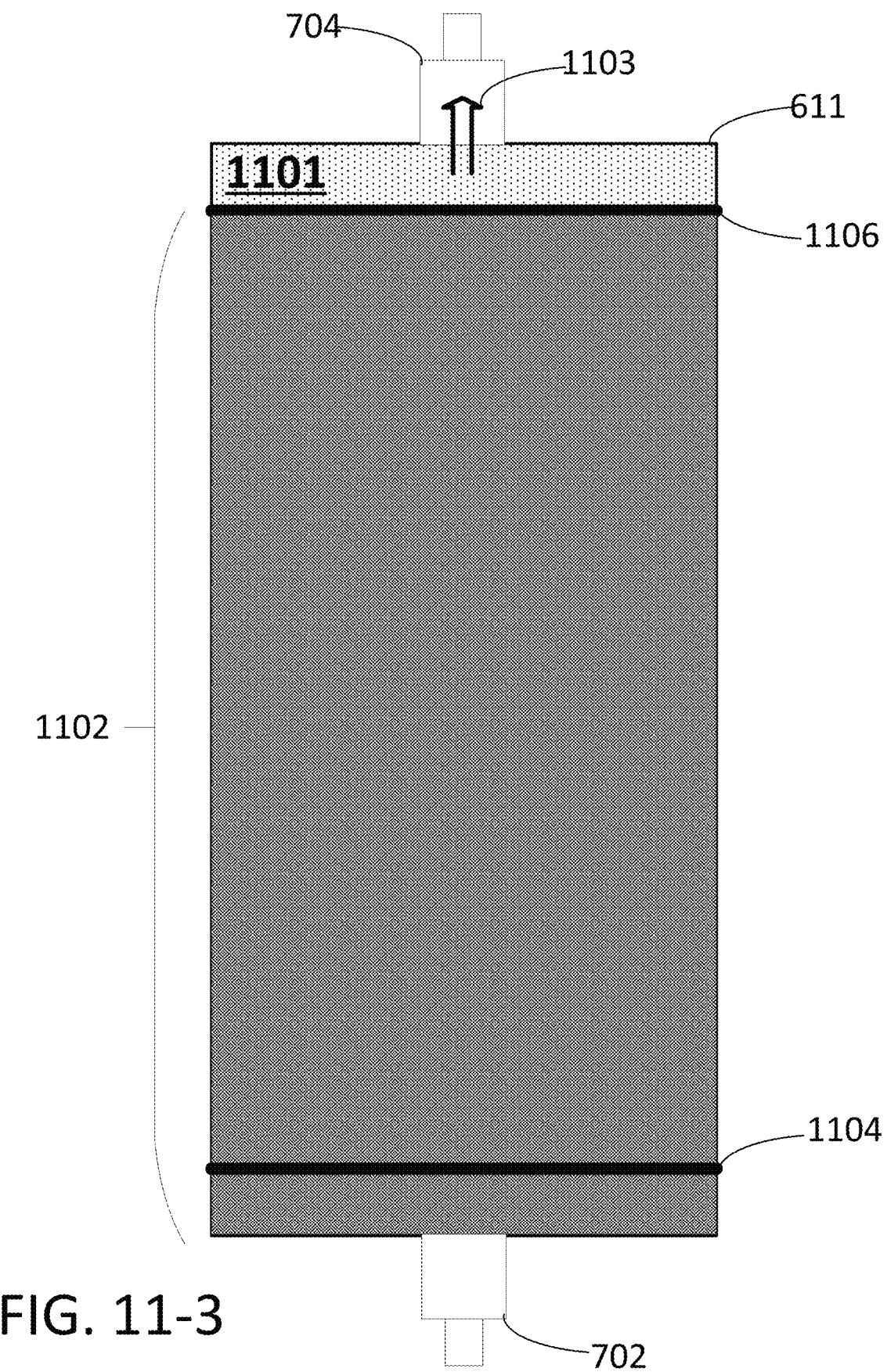
Figures 4, 11:
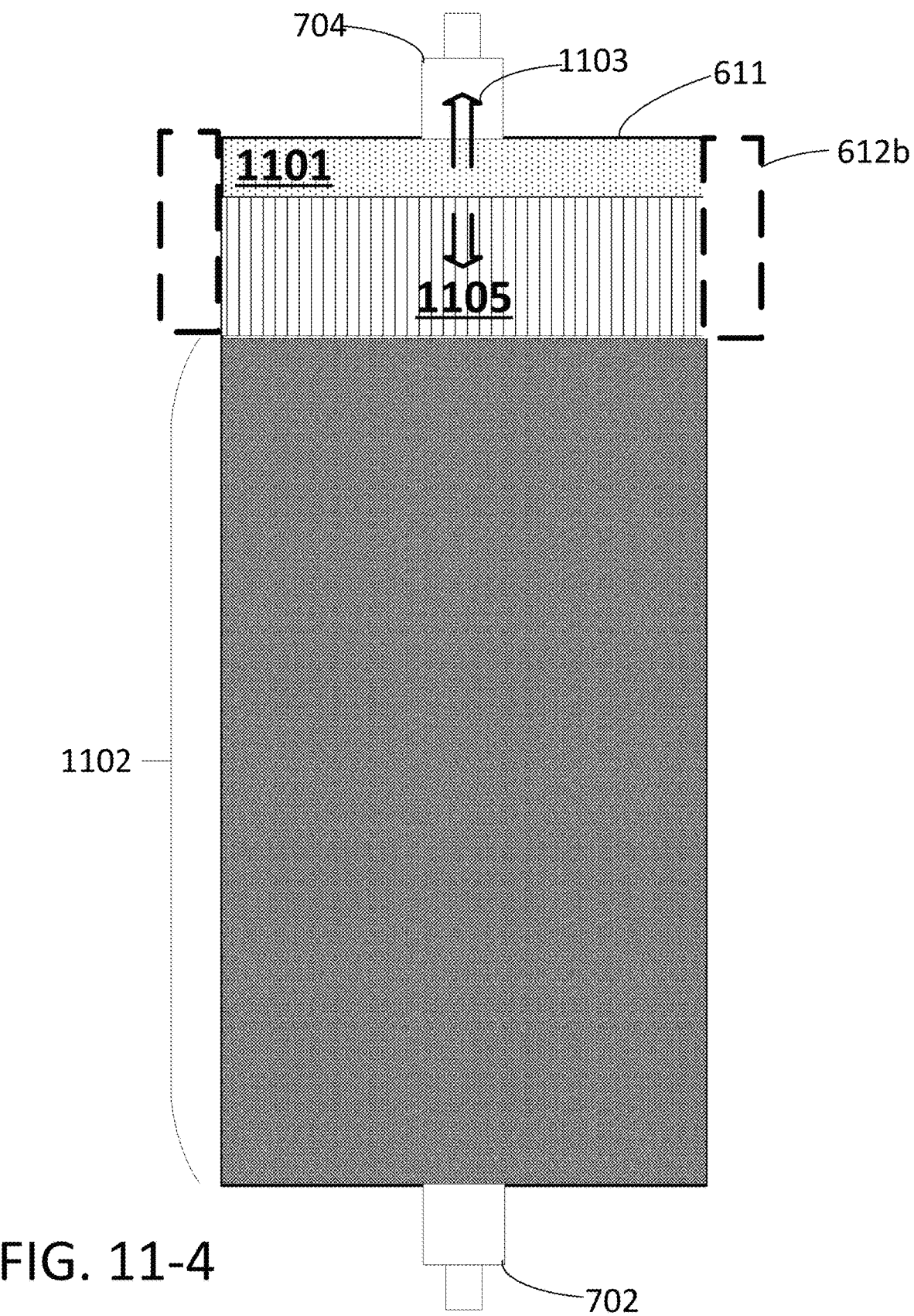

As shown in FIGS. 6, 10, and 11, the heated fluid may rise through the column. Said heated fluid may gently remove solvent via displacement. That is, a heated liquid, for example, may cause residual solvent to be thermally driven such that the solvent remains, for example, in liquid form as it exits vessel 611.

In another technique, the heated fluid may be at least a boiling point temperature of the solvent. In such embodiments, the residual solvent is evaporated and may flow to an optional condenser 614 and then to source 615 or another vessel. In some embodiments, source 615 may be the first condensing element that the vapor reaches (e.g., condensed via a cooled solvent tank).

Controller 602 may allow the heated fluid to progress to or near the top of vessel 611. As controller 602 monitors the progress, it may close fluid connector 604 and/or 606 in response to sensor 616 reaching or passing a certain temperature value. Said temperature value may be a target temperature for removing residual solvent and/or a temperature differential value between two or more sensors 616.

For example, controller 602 may close connectors 604 and 606 in response to a value based on at least value from one or more sensors 626. Then, pressure sensor 618 may be monitored, by a user and/or controller 602, to determine if a pressure value indicates that residual solvent yet remains in the (still) solvent-bearing mass. As explained below in more detail, a pressure signature value may be a vapor pressure value or an average thereof. In some embodiments, the pressure signature may include a raise in pressure beyond a threshold value, particularly in embodiments that fluidly isolate vessel 611 and monitor the pressure of the isolated vessel 611. However, the pressure signature is monitored, said signature indicates that residual solvent remains, and further heated fluid may be introduced.

The heated fluid may be introduced multiple times at multiple temperature for recovering multiple solvents with differing boiling points. For example, the heated fluid may be applied and removed at a boiling point temperature for each solvent type that resides within the solvent-bearing mass.

During or after the residual-solvent removal process, the heated fluid may be evacuated from vessel 611 to source 610. Heated vapor (e.g., steam) may be condensed within vessel 611 into a liquid before being transported back to source 610 or another vessel. In some embodiments, the condensed liquid's flow may be gravity assisted as it travels towards source 610.

Thermal element 612 may be thermally coupled to vessel 611 for cooling and/or heating the heated fluid. Thermal element may be a liquid jacket, an electrical jacket, or a Peltier device adapted to both heat and cool extraction vessel 611. In some embodiments, thermal element includes an inductive jacket for inductively heating one or more elements arranged within vessel 611, such as fins, protrusions, an extraction vessel cartridge that comprise at least one ferrous material.

Control 602 may thermally regulate heated fluid by applying heat, electrically and/or fluidly, to maintain at least a solvent boiling point temperature, cooling to condense said heated liquid, and/or heat equal at least a heated fluid boiling point temperature to assist in evacuating the heated fluid.

In general, system 600 is adapted, via controller 602, human operation, or a combination, to at least substantially maintain the heated fluid within vessel 611 during the residual solvent removal step(s). As such, the liquid or vapor-form solvent is generally free of the heated liquid, thus simplifying the solvent recovery process. Alternatively or alternatively, a cold trap may reside, for example, immediately downstream of an output orifice of vessel 611. In some embodiments, the cold trap's temperature condenses the (formerly) heated vapor into a liquid, but passes solvent vapor, which condenses at a lower temperature. Said cold trap may gravity feed said output orifice of vessel 611, thereby re-directing the liquid fluid back into vessel 611 and thereby substantially maintaining the fluid within the extraction vessel as system 600 only briefly allows perhaps some of the heated vapor to exit, but it is condensed and flowed back into vessel 611.

Figure 7:
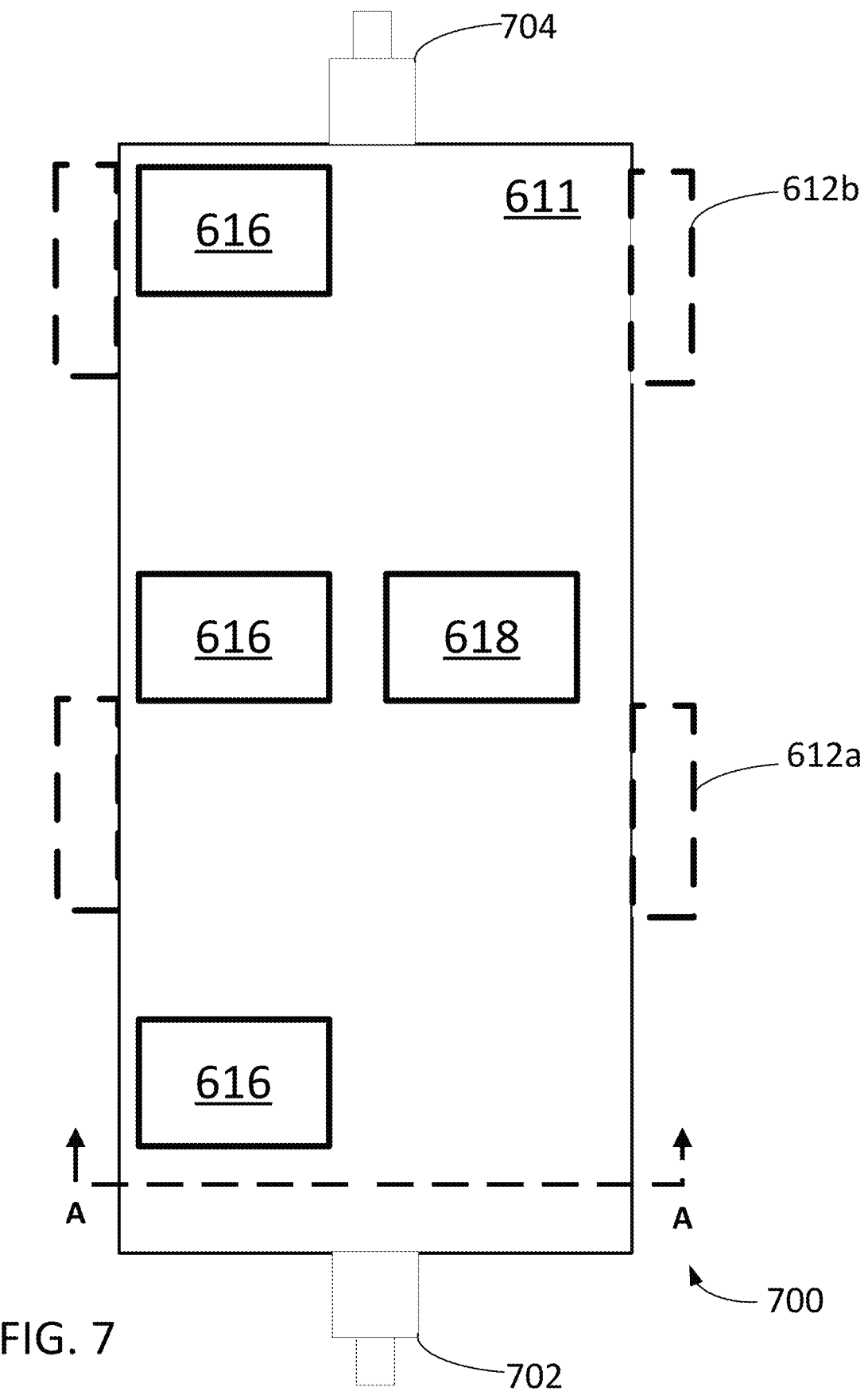
FIG. 7 is a schematic view of an extraction vessel.

FIG. 7 shows extraction vessel system 700, which includes extraction vessel 611 with a plurality of thermal sensors 616, pressure sensor 618, input orifice 702, output orifice 704, and at least one thermal element 612. At least one thermal element 612a may be arranged on or near a mid-section of vessel 611 for thermally regulating at least the heated fluid. One example of thermal regulation is maintaining at least a solvent boiling point temperature.

The thermal element(s) 612(b) may also be arranged to cool heated vapor (as the heated fluid) for condensing said vapor within vessel 611. In one example, the condensation temperatures of the heated vapor and the residual solvent vapor may be sufficiently far apart such that the vapor condenses in the top portion of vessel 611, but the solvent vapor passes through. In another example, thermal element 612(b) cools the heated vapor after most of the residual solvent has exited vessel 611, but before the heated vapor reaches output orifice 704.

As explained in more detail, thermal element(s) 612a and 612b may be thermally coupled to fins or other internal features for ensuring a core of the solvent-land mass reaches at least a solvent boiling point temperature. Thermal elements 612a and 612b may be arranged on an exterior of vessel 611 and said fins or other features arranged on or defining an interior of vessel 611.

FIGS. 8-1 and 8-2 show two possible cross sections of vessel 611 taken along line A of FIGS. 6 and/or 7. In general, all non-circular cavity 611i shape variations fall within the scope of the innovations. In FIG. 8-1, vessel 611 includes exterior 611a and interior 61b. Interior 61b defines a star-shaped cavity 611i and include protrusion 611j with peaks 611p and recesses 611c. FIG. 8-2 similarly defines a non-circular cavity 611i, which may be characterized as a ninja star or, more generally, a four-pointed star.

Protrusions 611j may be integral with interior 61b or may mechanically coupled to vessel 611 via welding or other techniques for defining non-circular cavity 611i. For example, as seen in FIGS. 8-3 and 8-4, joint 611k may couple protrusions 611j with vessel 611 via a notch defined on each protrusion. In alternative embodiments, joint 611k may comprise a tail defined by protrusion 611j that dovetails with a notch of vessel 611 (e.g., 611n of FIGS. 9-3 and 9-4).

Protrusions 611j may be passive such that it thermally couples a solvent-bearing mass with a thermal element that resides outside of cavity 611i (e.g., an electric or liquid jacket). Possible passive examples include thermally conductive metals (e.g., copper) and ferrous and non-ferrous materials.

In ferrous-material embodiments, protrusions 611j may be operably coupled to an induction source (e.g., an inductive jacket). The induction source may be adapted to heat protrusions 611j to a distillation temperature for distilling one or more solvents and/or components such as terpenes, flavonoids, and/or cannabinoids (e.g., THC).

For example, a jacketed coil of wire (not shown) may be operably coupled to vessel 611 and an alternating electric current is passed through said wire. The resulting oscillating magnetic field wirelessly induces an electrical current in one or more protrusions 611j. This induced eddy current that flows through the protrusions 611*j* results in heating of the solvent-bearing mass or material.

Figures 8, 9:
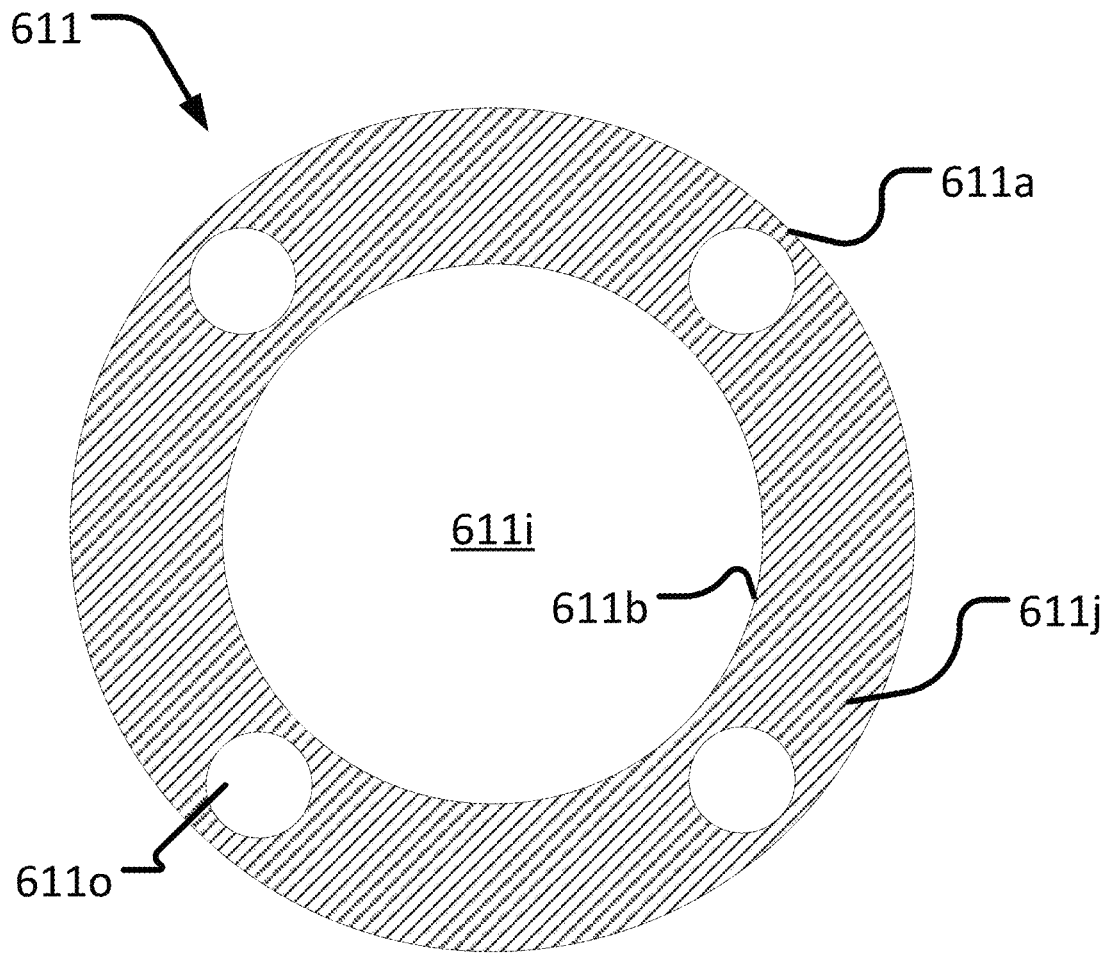
Figures 1, 9:
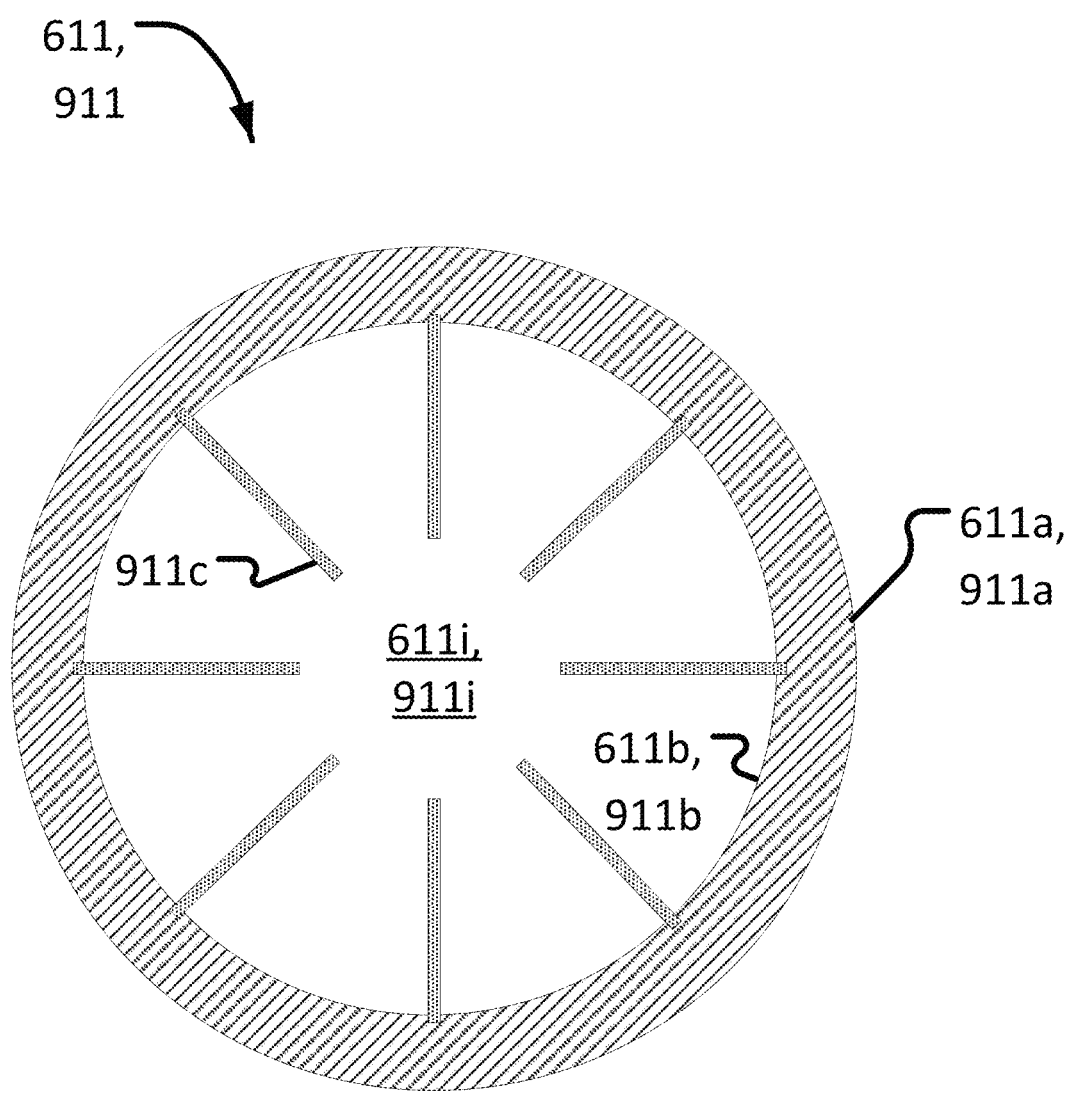
Figures 2, 9:
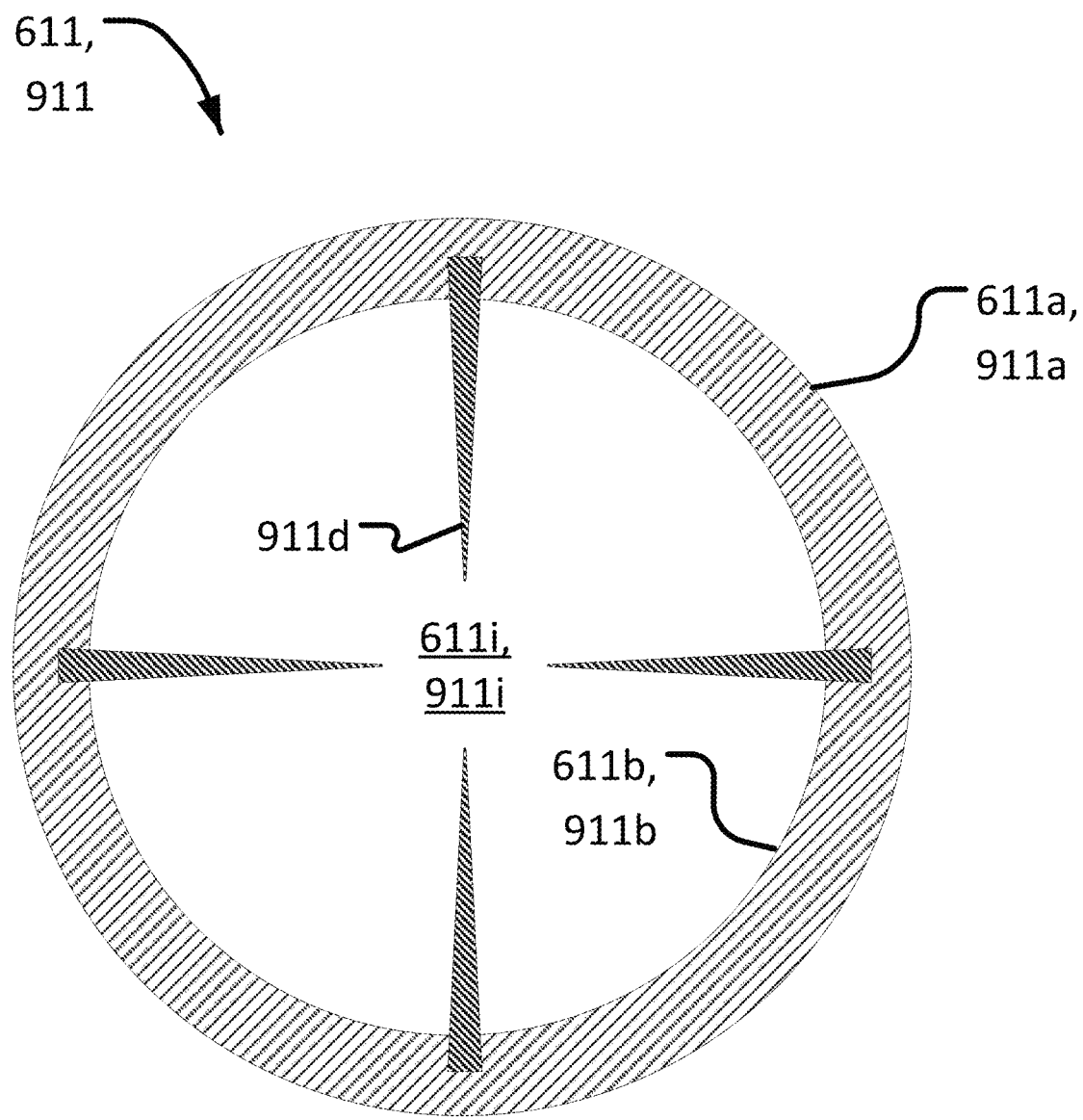
Figures 3, 9:
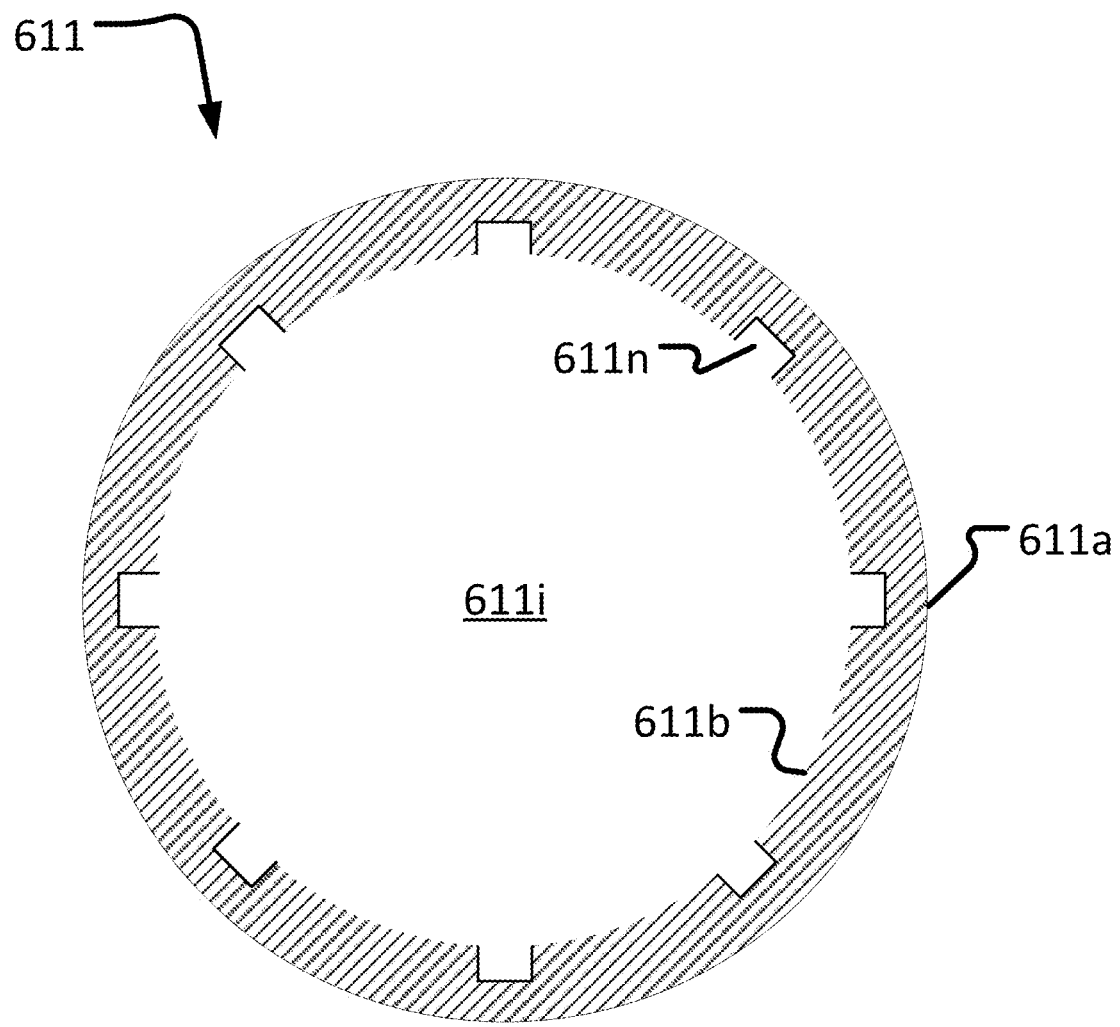
Figures 4, 9:
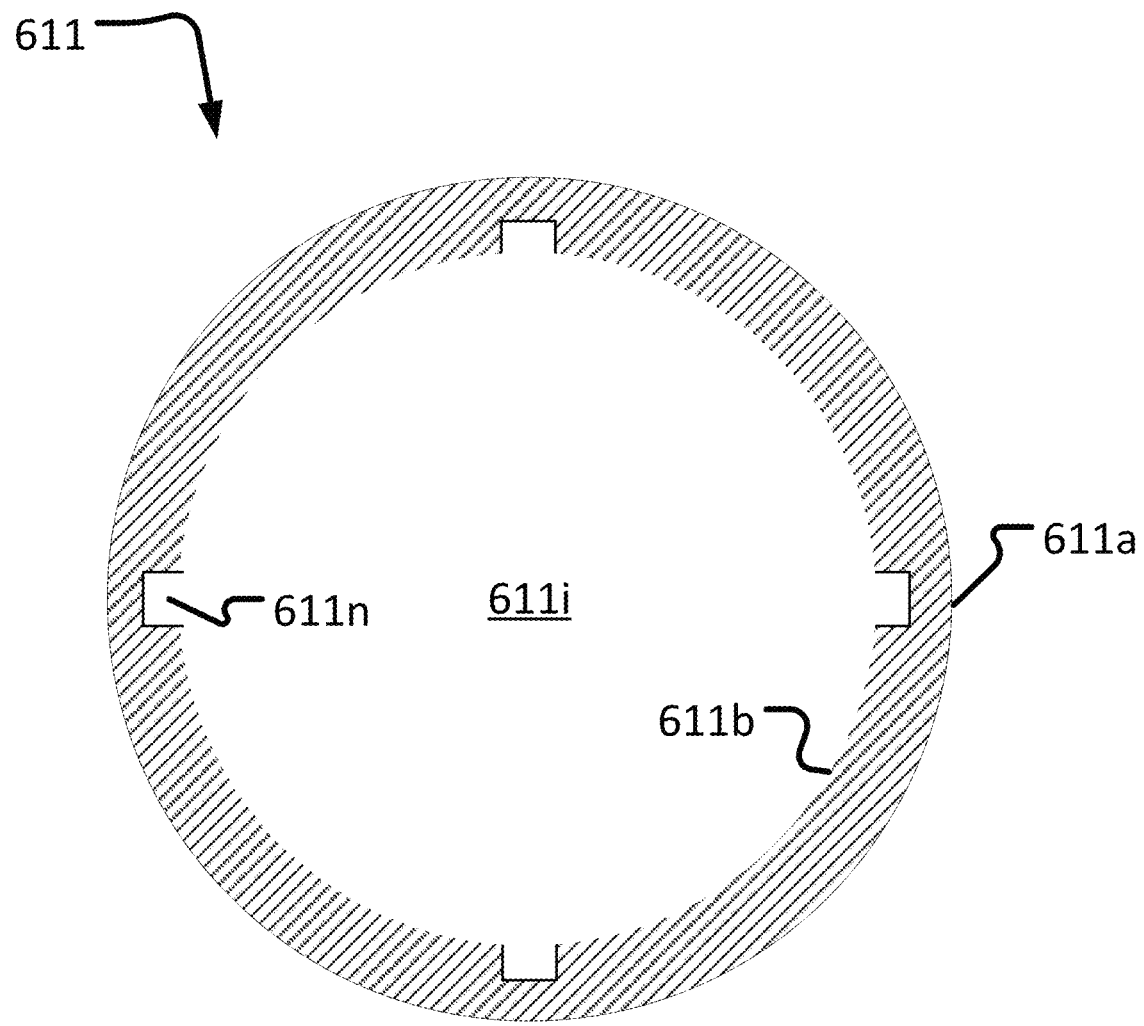

Alternatively or additionally, protrusions 611*j* may encompass heating element 611*h*, which may be a resistance heating feature running along a length of vessel 611 such as an electrical wire arranged and adapted to heat protrusion 611*j*. FIGS. 8-7, 8-8, and 8-9 show a plurality of orifices 611*o* arranged and adapted to thermally regulate vessel 611 via a thermally regulated fluid, typically for heating or cooling an extraction vessel before, during, or after an extraction process. Said orifices 611*O* partially define a channel that extends along a length of vessel 611. Said channel(s) (e.g., 611*t* of FIG. 19) are physically separated from cavity 611*i*, thereby preventing any mixture of a thermally regulating fluid with the solvent that resides within cavity 611*i*. Said channel(s) (e.g., 611*t* of FIG. 19) may partially define a circuit for flowing thermally regulated fluid.

FIGS. 8-5 and 8-6 show a cross section of extraction vessel cartridge 811, which is similar to the cartridge 302 shown in FIG. 3, but a non-cylindrical shape for dovetailing with non-circular cavity 611*i* of vessel 611. Said cartridge 811 is typically loaded up with a source material and then slid into vessel 611. Cartridge 302 may be, for example, a rigid mesh "basket" that contains the source material, but also allows solvent and other fluids to pass through.

Cartridge 811 includes exterior 811*a*, interior 811*b*, peak 811*p*, recessed 811*c*, and cavity 811*i*.

FIGS. 9-1 and 9-2 show two further possible cross sections of vessel 611 taken along line A of FIGS. 6 and/or 7 or an extraction cartridge vessel cartridge 911 similar to cartridge 302, but further comprising a plurality of fins 911*c*, 911*d*. In other words, a plurality of fins 911*c* or 911*d* may be arranged on extraction vessel 611 or cartridge 911. In either case, a plurality of fins resides within extraction vessel 611 for thermally coupling with a solvent-bearing mass.

Exterior 611*a*, 911*a* may define a generally circular shape. Interior 611*b*, 911*b* may be generally define a circular cavity 611*i*, 911*i* and have one or more fins 911*c* and 911*d* arranged within it. Said fins may each encapsulate (or define) a resistant heating element (e.g., Joule heating) for directly heating a solvent-bearing mass, with or without assistance from a heated fluid and/or an exterior thermal element such as a liquid jacket. That is, fins 911*c* and 911*d* may actively heat via an electrical signal or passively heat via an external heating element that is thermally coupled to said fins 911*c* and 911*d*. Other shaped fins are within the scope of the innovations as FIGS. 9-1 and 9-2 show only two example shapes: tapered fin 911*d* and non-taped fin 911*c*.

For example, fins 911*c* and 911*d* may be thermally coupled to a liquid jacket and thereby transfer heat from interior 61*b* towards the core of a solvent-bearing mass. Said fins 911*c* and 911*d* may be mechanically coupled to interior 61*b*. In one example, each fin 911*c*/911*d* may be welded onto interior 61*b*. The length of each fin may span the length of vessel 611 or only a section thereof (e.g., only a mid-section of vessel 611).

Alternatively or additionally, fins 911*c* and 911*d* may comprise a ferrous material that is arranged and adapted to be heated via induced eddy currents (e.g., inductive heating). Alternatively or additionally, cartridge 911 or a circular-cross-section cartridge may comprise a ferrous material that are arranged and adapted to be heated via induced eddy currents. In some embodiments, exterior 611*a* and/or exterior 611 *b* comprise a non- or weakly (e.g., weakly ferromagnetic) ferrous material.

FIGS. 9-3 and 9-4 show two further possible cross sections of vessel 611 taken along line A of FIGS. 6 and/or 7. Interior 611*b* defines a plurality of notches 611*n* for coupling with a respective plurality of protrusions such as fins 911*c*, 911*d*, and/or protrusions 611*j*. Alternatively, a protrusion (e.g., fins 911*c*, 911*d* and/or protrusions 611*j*) may define a notch that couples with a coupling protrusion defined by interior 61*b*.

FIG. 10 shows changes in the thermal gradient as the heated liquid, in this example, raises from the bottom of vessel 611 to near a tope of vessel 611. In some embodiments, a gradient "length" is measured by a plurality of thermal sensors such that a controller, in response to the length passing or matching a threshold value, will close at least one fluid connector to (1) stop the introduction of the heated fluid into vessel 611; (2) stop the heated fluid from leaving vessel 611; (3) or both (1) and (2). A gradient length may be defined as the distance between an upper edge of a relatively uniform heated section and an opposing cold section or other end point.

In some embodiments, a gradient is not considered, but rather a local temperature near a top section of vessel 611 matching or passing a temperature value, indicative of the heated liquid occupying a corresponding area within the extraction vessel 611 and, in response, a controller performs one or more of the above mention steps (1) and (2). For example, as seen at T3, vessel 611 includes an internal temperature sensor 616 dimensioned and arranged to detect a heated fluid temperature at location that allows for a controller to close an exit fluid connector before the heated liquid leaves vessel 611 and/or stop the supply of heated liquid by closing an entrance fluid connector of vessel 611.

FIGS. 11-1 to 11-4 shows this process in more detail via a schematic cross sectional sideview of vessel 611. At a first stage of the residual solvent recovery process, a heated fluid may flow through perforated disc 1104 for possibly a more even redistribution of the flow of a possibly pressurized heated fluid that flows from input orifice 702. Said disc 1104 may prevent channeling of the heated fluid as it passes through solvent-bearing mass 1101.

At this point of the solvent recovery process, boundary layer 1106 shows a dividing line between the leading edge of the rising heated fluid as said fluid proceeds to move up extraction vessel 611. At this point, the heated fluid occupies area 1102, which includes only a bottom section of vessel 611. Although the heated fluid is showing a "bottom-filling" environment, heated fluids may be alternatively side-loaded or top-loaded.

The heated fluid causes solvent 1103 to flow upward. In some embodiments, solvent 1103 may substantially retain a liquid state. In other embodiments, solvent 1103 may be substantially solvent vapor, with the heated fluid being at least a solvent boiling point temperature. In some embodiments, the heated fluid may be substantially above said boiling point temperature.

FIG. 11-2 shows vessel 611 at a later stage of the residual solvent recovery process. Area 1102 has increased and boundary layer 1106 has risen to be closer to output orifice 704, which is passing solvent 1103 that is "pushed out" by heated fluid. That is, residual solvent 1103 exits extraction vessel 611.

FIG. 11-3 shows vessel 611 at an even later stage of the residual solvent recovery process. Area 1102 has increased and boundary layer 1106 has risen to be near output orifice 704. At this point in time (or soon thereafter) output orifice 704 is closed for blocking the heated fluid from exiting vessel 611. After sealing vessel 611, including possibly closing input orifice 702, an extraction vessel pressure may be monitored to determine if there is a significant amount of residual solvent remaining.

FIG. 11-4 shows vessel 611 at a late stage of the residual solvent recovery process. Area 1102 had increased and boundary layer 1106 has risen to be near output orifice 704. Thermal element 612b cools the top section of vessel 611 for producing condensed portion 1105, which comprises condensed fluid, but passes solvent 1103 in vapor form. In other words, thermal element 612b at least substantially retains heated fluid within vessel 611 by condensing, for example, water vapor, but passing hydrocarbon solvents, which have much lower condensing temperatures.

FIG. 12 shows a method for recovering solvent from solvent-bearing mass. Step 1202 includes introducing, into an extraction vessel containing at least the solvent-bearing mass, a first heated fluid portion into a first input orifice of the extraction vessel, the first heated fluid portion having a first temperature that is at least equal to a first solvent boiling point temperature. Step 1204a includes evaporating, by the first heated fluid portion, a first liquid solvent portion from the solvent-bearing mass, thereby producing a first solvent vapor portion. Optional step 1205 includes heating, during the evaporating step 1204a, the extraction vessel or an operably coupled extraction component thereof (e.g., fins or protrusions) for maintaining the first heated fluid portion at at least the first temperature. Said heating may include a liquid jacket, electric jacket, resistive heating elements, among other examples, applying heat to an extraction vessel or directly to a solvent-bearing mass.

Step 1206 includes collecting at least the first solvent vapor portion after exiting a first output orifice of the extraction vessel. Step 1208 includes at least substantially containing, during the collecting the at least the first solvent vapor portion step 1206, the first heated fluid portion within the extraction vessel. Step 1210 include evacuating, after at least the evaporating the first liquid solvent portion step 1204a, the first heated portion and/or a liquid portion thereof from the extraction vessel. Said evacuation may be pressure-, thermal-, gravity-, and/or vacuum-assisted. For example, a pressure source may force out the heated portion (an example of pressure-assisted evacuation). The heated portion may be vapor, liquid, or a combination thereof. In some embodiments, the heated portion is condensed within the extraction vessel before evacuation. Thermal-assisted embodiments include heating the heated portion to its boiling point temperature to evacuate a vapor or condensing the heated portion to evacuate a liquid from the extraction vessel.

FIG. 13 shows a sub-method for recovering solvent from solvent-bearing mass in which step 1208a includes condensing, during the collecting the at least the first solvent vapor portion step 1206, at least a sub-portion of the first heated fluid portion within the extraction vessel and thereby producing a first liquid portion.

FIG. 14 shows a sub-method for recovering solvent from solvent-bearing mass in which step 1210 includes evaporating, by a second heated fluid portion, a second liquid solvent portion from the solvent-bearing mass, thereby producing a second solvent vapor portion.

FIG. 15 shows a sub-method for recovering solvent from solvent-bearing mass in which step 1202a includes introducing, into an extraction vessel, a first heated fluid portion into a first input orifice of the extraction vessel, the first heated fluid portion having a first temperature that is at least equal to a solvent boiling point temperature that is sufficient to evaporate at least a sub-plurality of solvents. Step 1204b includes evaporating, by the first heated fluid portion, a first liquid solvent portion comprising at least the sub-plurality of solvents, thereby producing a first solvent vapor portion.

FIG. 16-1 shows a sub-method for recovering solvent from solvent-bearing mass. Step 1207a includes maintaining an extraction vessel at a solvent boiling-point temperature. Said temperature may be monitored with a thermal sensor arranged inside and/or an exterior surface of an extraction vessel.

Step 1209a includes monitoring at least an extraction vessel pressure. Said pressure may be monitored with a pressure sensor (e.g., a probe and/or gauge) that is operably coupled to the extraction vessel. In this example, "after step 1204a" of step 1209a merely specifies a particular instance of when pressure monitoring is occurring, but not necessarily when said monitoring is initiated. For example, a pressure may be monitored by a controller or human operator before, during, and/or after most steps.

Step 1212 includes evaporating further residual solvent that remains in an extraction vessel if the monitored pressure indicates that residual solvent remains in the solvent-bearing mass. One example embodiment of step 1209a includes monitoring a sealed extraction vessel that is maintained at at least a solvent boiling point temperature. In general, if residual solvent remains within an extraction vessel, a vapor pressure (gauge) value will match a vapor pressure signature of said residual solvent while the extraction vessel is maintained at a solvent boiling point temperature of a particular solvent or a mixture thereof. Example embodiments include detecting a particular pressure threshold value or change in pressure value with respect to a previously measured pressure value (e.g., pressure values from before and after sealing of the extraction vessel).

FIG. 16-2 shows a sub-method for recovering solvent from solvent-bearing mass. Step 1207b includes maintaining at least a solvent-boiling point temperature for the extraction vessel and at least a solvent-condensing temperature for a fluidly connected extraction system component. For example, solvent tank or other condensing component may be fluidly coupled with an extraction vessel. Additionally or alternatively, a fluidly connected extraction system component may be maintained at a temperature that is below the solvent-boiling point temperature, but above the solvent-condensing temperature.

Step 1209b includes monitoring a pressure of at least the extraction vessel and the fluidly connected extraction system component. Step 1212 includes evaporating further residual solvent that remains in an extraction vessel if the monitored pressure indicates that residual solvent remains in the solvent-bearing mass. In general, if residual solvent remains within an extraction vessel, a vapor pressure (gauge) value may be an average of the vapor pressure of the heated extraction vessel and the cooled extraction system component (e.g., a cooled solvent tank).

Upon the residual solvent being at least substantially removed from the extraction vessel, there is no further solvent to supply the vapor pressure. Thus, the measured pressure (whether it be measured at the extraction vessel, the fluidly coupled component, or a fluid line therebetween) will drop and eventually matched the vapor pressure value of the fluidly coupled component. For example, a cooled solvent tank of butane, at around 50° F./10° C. may have a vapor pressure of around 7 $psi_g$/0.5 bar (by rounding up from the value shown in TABLE 1), indicating that a fluidly coupled extraction vessel, even if heated, is not contributing to the vapor pressure average. Readings above around 7 $psi_g$/0.5 bar would indicate a vapor-pressure contribution from the extraction vessel. That is, the vapor signature of residual butane solvent remaining in an extraction vessel is generally above 7 $psi_g$/0.5 bar in the case that a fluidly coupled extraction system component is containing solvent and held to around 50° F./10° C.

An assortment of example vapor pressure values for butane, propane, and mixtures thereof are shown in TABLE 1, below. In an example embodiment, said values of TABLE 1 or similar values may be stored in memory (e.g., a look-up table) that is operably coupled to a controller for the controller to determine if residual solvent remains within an extraction vessel. In a further example embodiment, an operator (e.g., a user) of the extraction system can select which solvent or solvent blend is being used or directly select the vapor pressure value. Based on the selected solvent or solvent blend (along with a measured or predetermined vessel temperature value(s)), a controller can select or use a particular vapor pressure value as a value that indicates that residual solvent remains in an extraction vessel. More generally, a controller can determine if there is residual solvent remaining in the extraction vessel based on a selected vapor pressure value (e.g., pre-selected by a user or a controller) or a determined vapor pressure value (e.g., a controller-calculated value based on vessel temperature measurements) for a particular solvent or solvent blend.

ment 612 may be heating vessel 611 while thermal element 111 is cooling solvent tank 615a. While vessel 611, component 617, and tank 615a are in fluid communication, the respective sensors 618, 618a, and 618b should be providing an average vapor pressure, as explained above.

Alternatively or additionally, extraction system component 617 and vessel 611 may be isolated such that the extraction vessel 611 is otherwise sealed besides being fluid coupled to component 617. In such embodiment, the pressure value from pressure sensor 618a may reflect the local vapor pressure of vessel 611, particularly when component 617 is substantially devoid of, for example, condensed solvent and is of the same or similar temperature of extraction vessel 611. Similarly, component 617 may isolate tank 615a to determine the local vapor pressure of tank 615a. In some cases, sensor 618a may become more accurate in determining said local vapor pressure value when component 617 is largely devoid of solvent vapor and is of the same or similar temperature as tank 615a if, for example, tank 615a is holding condensed solvent. In some embodiments, the above-described isolation measurements can be taken in addition to the above-described average vapor pressure measurements.

Figure 18:
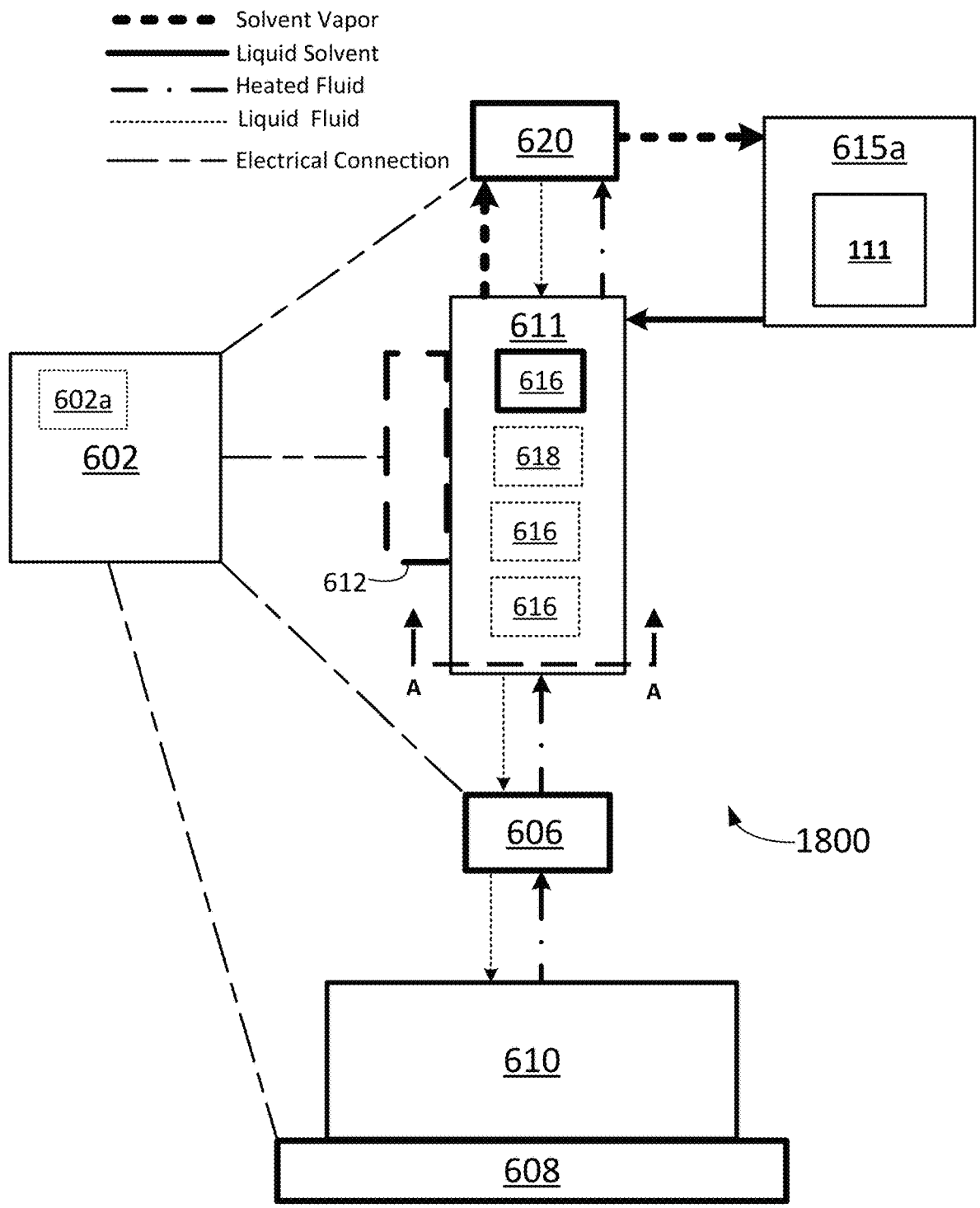

FIG. 18 shows extraction system 1800, which omits the solute and solute-solvent mixture lines for highlighting other aspects of system 1800. Cold trap 620 may be maintained at a fluid-condensing temperature that condenses the heated fluid into a liquid fluid, but passes solvent vapor, which condenses at a colder temperature in, for example, solvent tank 615a. For example, the heated fluid may be water vapor or steam and the solvent may be butane.

TABLE 1

Vapor Pressure ($psi_g$/bar)

| Temperature (F./C.) | Propane ($C_3H_8$) % : 100 | 70 | 50 | 30 | 0 |
|---|---|---|---|---|---|
| | Butane ($C_4H_{10}$) % : 0 | 30 | 50 | 70 | 100 |
| -44 / -42.2 | 0 | 0 | 0 | 0 | 0 |
| -30 / -34.4 | 6.8 / 0.469 | 0 | 0 | 0 | 0 |
| -20 / -28.9 | 11.5 / 0.794 | 4.7 / 0.324 | 0 | 0 | 0 |
| -10 / -23.3 | 17.5 / 1.21 | 9 / 0.621 | 3.5 / 0.242 | 0 | 0 |
| 0 / -17.8 | 24.5 / 1.69 | 15 / 1.04 | 7.6 / 0.524 | 2.3 / 0.159 | 0 |
| 10 / -12.2 | 34 / 2.35 | 20.5 / 1.41 | 12.3 / 0.849 | 5.9 / 0.407 | 0 |
| 20 / -6.67 | 42 / 2.9 | 28 / 1.93 | 17.8 / 1.23 | 10.2 / 0.704 | 0 |
| 30 / -1.11 | 53 / 3.66 | 36.5 / 2.52 | 24.5 / 1.69 | 15.4 / 1.06 | 0 |
| 40 / 4.44 | 65 / 4.49 | 46 / 3.17 | 32.4 / 2.24 | 21.5 / 1.48 | 3.1 / 0.214 |
| 50 / 10 | 78 / 5.38 | 56 / 3.86 | 41 / 2.83 | 28.5 / 1.97 | 6.9 / 0.476 |
| 60 / 15.6 | 93 / 6.42 | 68 / 4.69 | 50 / 3.45 | 36.5 / 2.52 | 11.5 / 0.794 |
| 70 / 21.1 | 110 / 7.59 | 82 / 5.66 | 61 / 4.21 | 45 / 3.11 | 17 / 1.17 |
| 80 / 26.7 | 128 / 8.83 | 96 / 6.62 | 74 / 5.11 | 54 / 3.73 | 23 / 1.59 |
| 90 / 32.2 | 150 / 10.4 | 114 / 7.87 | 88 / 6.07 | 66 / 4.55 | 30 / 2.07 |
| 100 / 37.8 | 177 / 12.2 | 134 / 9.25 | 104 / 7.18 | 79 / 5.45 | 38 / 2.62 |
| 110 / 43.3 | 204 / 14.1 | 158 / 10.9 | 122 / 8.42 | 93 / 6.42 | 47 / 3.24 |

Figure 17:
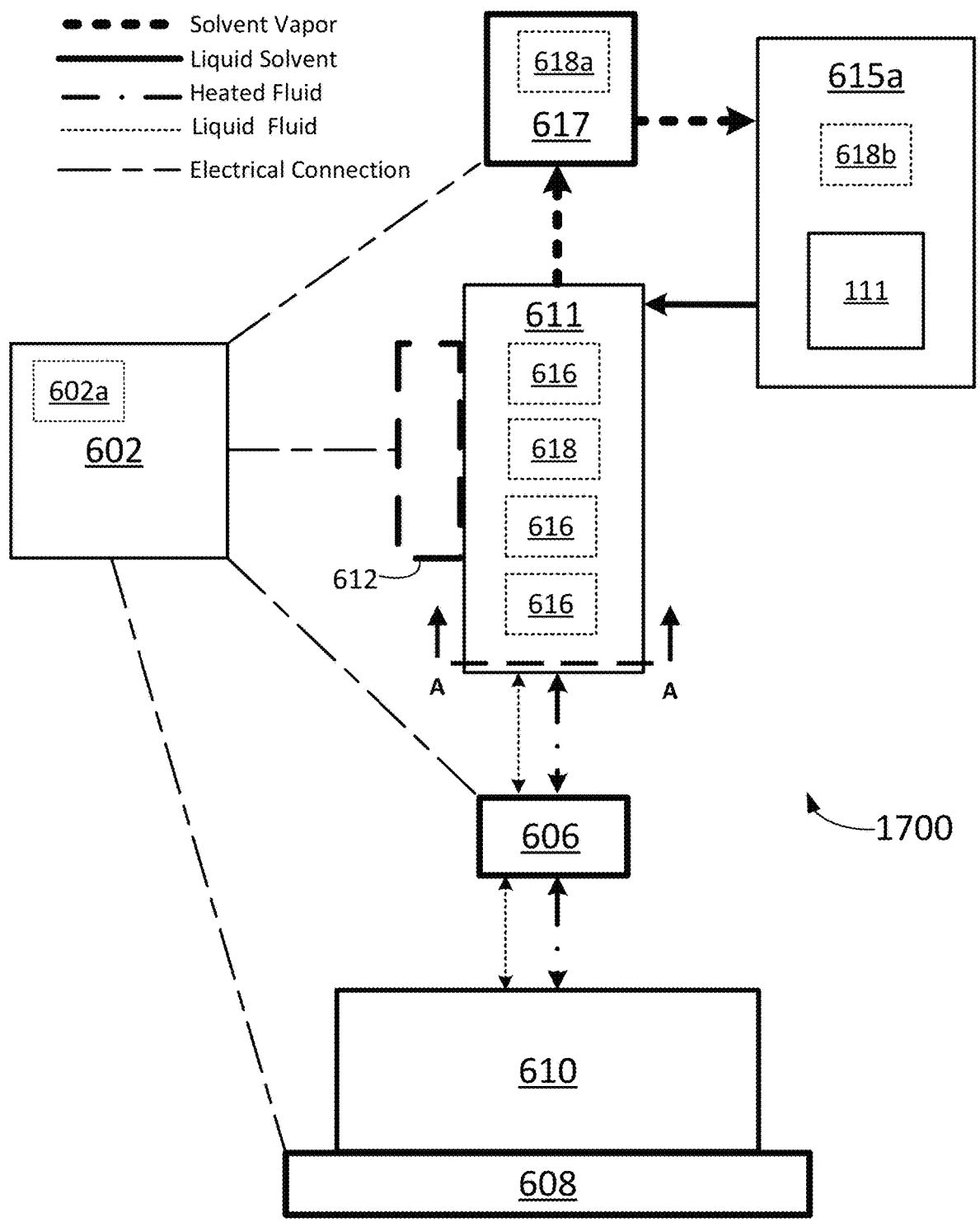
FIGS. 17, 18, and 19 are schematic views of extraction systems.

FIG. 17 shows extraction system 1700, which omits the solute and solute-solvent mixture lines for highlighting other aspects of system 1700. Pressure sensors 618a and 618b are operably coupled, respectively, to extraction system component 617 and solvent tank 615a. Controller 602 may be operably coupled to sensors 618a and 618b. Thermal ele- Cold trap 620 may be arranged directly above vessel 611 such that the condensed liquid fluid may be gravity assisted in flowing back into vessel 611. Cold trap 620 may be in addition or an alternative to cooling vessel 611 to further ensure heated fluid does not reach tank 615*a*. Cold trap 620 may include a condenser and/or other vapor coolers for condensing the heated fluid.

Figure 19:
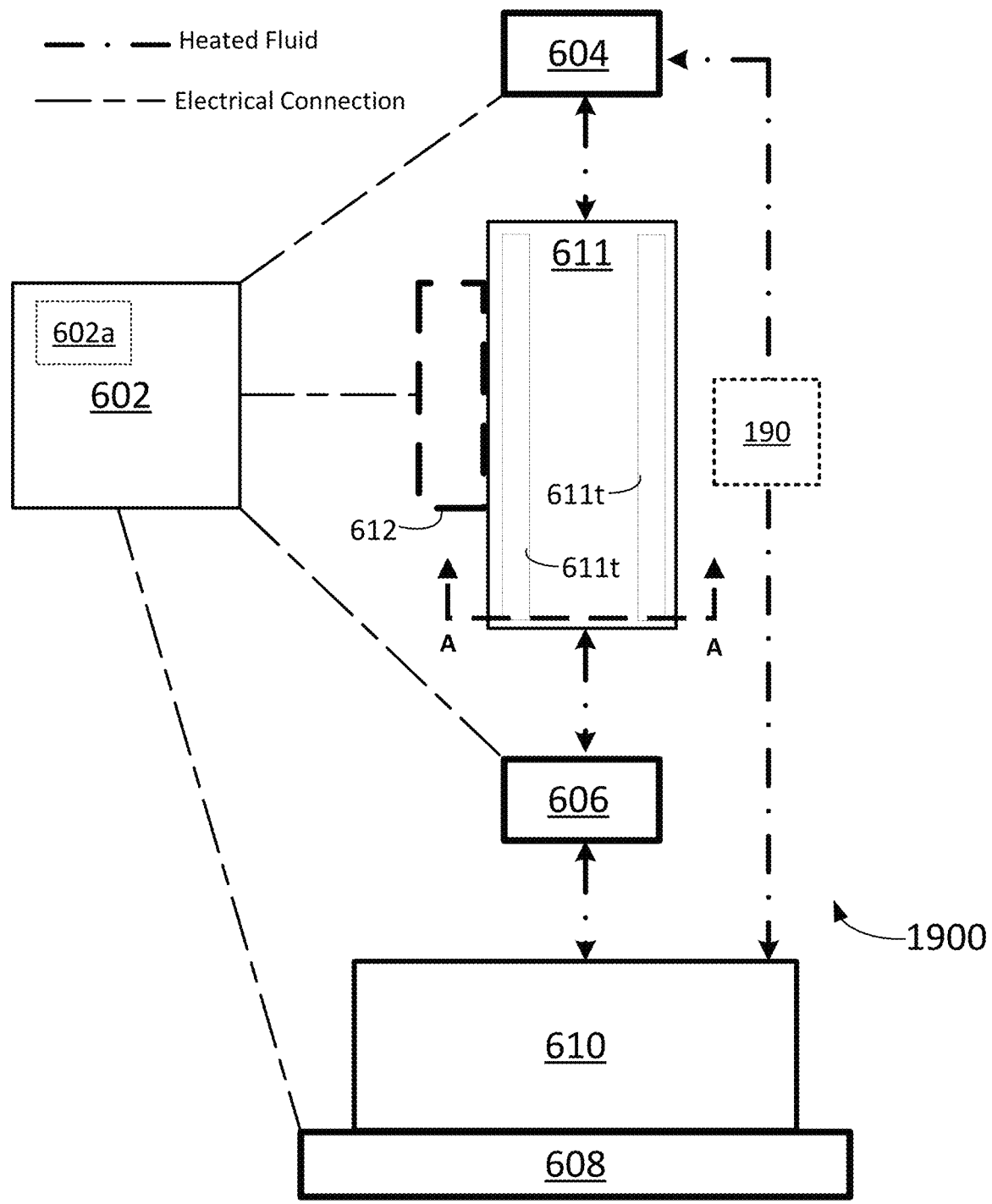

FIG. 19 shows extraction system 1900, which omits the solvent, solute, and solute-solvent mixture lines for highlighting other aspects of system 1900. Vessel 611 may have a cross section that defines a plurality of channels 611*t* that are physically separate from a center channel that contains a mass for extraction. Three possible cross sections are shown in FIGS. 8-7, 8-8, and 8-9, which show peripheral orifices 611*o* that partially define said channels 611*t*. In such embodiments, heated (or cooled) fluid can be circulated through channels 611*t* and back to heated fluid source 610. Said circulation may be pump assisted via optional pump 190. Channels 611*t* are shown in a dashed line format to signify that channel 611*t* is an internally defined space of vessel 611.

Additionally or alternatively, vessel 611 may be thermally regulated to cool said vessel 611. For example, a cooling fluid may be supplied to channel 611*t* for a cold extraction process or other thermal regulating process such as condensing solvent or decreasing an extraction vessel pressure.

The disclosure above encompasses multiple distinct inventions with independent utility. While each of these inventions has been disclosed in a particular form, the specific embodiments disclosed and illustrated above are not to be considered in a limiting sense as numerous variations are possible. For example, residual solvent can be removed from other extraction vessels that contain a solvent-bearing mass besides a vessel that is involved in (e.g., a first-pass) extraction of a solute-bearing mass. For example, a solvent-bearing mass may be physically removed from a first extraction vessel to a second extraction vessel such as a separator vessel, among other possible extraction system components, which otherwise performs the same residual-solvent recovery steps and methods. Such a separation vessel should also be understood as being an "extraction vessel" as it is removing residual solvent from an extraction process while substantially maintaining the solvent-bearing mass within said vessel. Additionally or alternatively, residual solvent may be removed from said mass before physically moving it out of the vessel that was also used for extracting solute from said mass.

The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. An extraction vessel comprising:
   an elongated vessel defining at least an interior cavity for solid-liquid extraction; and
   a plurality of protrusions that (A) are arranged within the elongated vessel, (B) extend into the interior cavity, and (C) are further arranged to thermally regulate a core of a solvent-bearing mass within the interior cavity.

2. The extraction vessel of claim 1 with the plurality of protrusions comprising a plurality of fins that (A) are arranged within the elongated vessel, (B) extend into the interior cavity, and (C) are arranged to thermally regulate the core of the solvent-bearing mass within the interior cavity.

3. The extraction vessel of claim 1 with each of the plurality of protrusions substantially spanning a length of the elongated vessel.

4. The extraction vessel of claim 1 further comprising a thermal jacket that is thermally coupled to at least the plurality of protrusions.

5. The extraction vessel of claim 4 with the thermal jacket mechanically coupled to an exterior portion of the elongated vessel.

6. The extraction vessel of claim 1 with the plurality of protrusions each comprising one or more heating elements.

7. The extraction vessel of claim 1 with the plurality of protrusions each comprising one or more resistive heating elements.

8. The extraction vessel of claim 1 with the plurality of protrusions each defining a channel for transporting a thermally regulating fluid across a length of the extraction vessel.

9. The extraction vessel of claim 1 with the plurality of protrusions each comprising a ferrous material.

10. The extraction vessel of claim 1 with the plurality of protrusions thermally coupled to the elongated vessel.

11. The extraction vessel of claim 1 with the plurality of protrusions thermally coupled to an exterior of the elongated vessel.

12. The extraction vessel of claim 1 with the plurality of protrusions arranged to thermally regulate the core of a solvent-bearing biomass within the interior cavity.

13. An extraction vessel comprising:
    an elongated vessel defining at least an interior cavity for solid-liquid extraction of biomass; and
    a plurality of protrusions that (A) are arranged within the elongated vessel, (B) extend into the interior cavity, and (C) are further arranged to thermally regulate a core of a solvent-bearing biomass within the interior cavity.

14. The extraction vessel of claim 13 with at least one of the plurality of protrusions substantially spanning a length of the elongated vessel.

15. The extraction vessel of claim 14 with the at least one of the plurality of protrusions defining a channel for transporting a thermally regulating fluid across the length of the extraction vessel.

* * * * *